(12) United States Patent
Zhao et al.

(10) Patent No.: US 10,785,808 B2
(45) Date of Patent: Sep. 22, 2020

(54) RANDOM ACCESS METHOD AND EQUIPMENT

(71) Applicant: China Academy of Telecommunications Technology, Beijing (CN)

(72) Inventors: Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 302 days.

(21) Appl. No.: 15/580,551

(22) PCT Filed: Mar. 22, 2016

(86) PCT No.: PCT/CN2016/076985
§ 371 (c)(1),
(2) Date: Dec. 7, 2017

(87) PCT Pub. No.: WO2016/197656
PCT Pub. Date: Dec. 15, 2016

(65) Prior Publication Data
US 2020/0037371 A1    Jan. 30, 2020

(30) Foreign Application Priority Data

Jun. 9, 2015  (CN) .......................... 2015 1 0312744

(51) Int. Cl.
*H04W 74/08*    (2009.01)
*H04W 76/11*    (2018.01)
(Continued)

(52) U.S. Cl.
CPC ....... *H04W 74/0866* (2013.01); *H04W 48/10* (2013.01); *H04W 56/001* (2013.01);
(Continued)

(58) Field of Classification Search
None
See application file for complete search history.

(56) References Cited

U.S. PATENT DOCUMENTS 9,253,692 B1 * 2/2016 Shah ................. H04W 36/0072
9,769,644 B2 * 9/2017 He ......................... H04W 72/02
                                                                370/328
(Continued)

FOREIGN PATENT DOCUMENTS

| CN | 103533663 A | 1/2014 |
| CN | 104469949 A | 3/2015 |
| WO | WO-2015/119555 A1 | 8/2015 |

OTHER PUBLICATIONS

Alcatel-Lucent: "RACH-less Handover in 11-15 synchronized networks", 3GPP Draft; R2-072655 RACH-Less Handover in Synchroniz ED Networ7s, 3rd Geueration i5artnership Pruject (3GPP), Mobile Competence Centre ; 650, Route Des Lucioles ; F-06921 Sophia-Antipolis Cedex ; France, vol. TSG RAN, na. Orlando; Jun. 25-29, 2007, Dtd Jun. 22, 2007 XP050603109.
(Continued)

*Primary Examiner* — Anh Vu H Ly
(74) *Attorney, Agent, or Firm* — Foley & Lardner LLP

(57) ABSTRACT

The present invention relates to the field of radio frequency communications, and in particular, to a random access method and equipment. The invention resolves an issue of being unable to apply a random access process to a situation having strict latency requirement, owing to a longer latency during the random access process. In one embodiment of the invention, the method comprises: transmitting, by a user equipment (UE) and according to a resource in a resource pool dedicated to a contention-based random access procedure, UE identification information to a neighborhood; and if receiving a contention resolution message from the neighborhood, determining, by the UE and according to the
(Continued)

contention resolution message, whether the contention-based random access procedure is successful. The random access procedure disclosed by present invention further comprises: determining, by the UE and according to second resource information, a resource dedicated to uplink transmission in a target neighborhood; and accessing, according to the resource dedicated to uplink transmission, into the target neighborhood. The embodiments of the invention decreases timing latency of the random access procedure by reducing interaction steps during the random access procedure, and as a consequence, the embodiments can be applied to the situation having the strict latency requirement.

17 Claims, 9 Drawing Sheets

(51) Int. Cl.
*H04W 76/27* (2018.01)
*H04W 48/10* (2009.01)
*H04W 56/00* (2009.01)
*H04W 72/14* (2009.01)
*H04W 80/02* (2009.01)

(52) U.S. Cl.
CPC ....... *H04W 72/14* (2013.01); *H04W 74/0833* (2013.01); *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2012/0008524 A1 | 1/2012 | Amirijoo et al. | |
| 2012/0182977 A1* | 7/2012 | Hooli | H04W 72/1278 370/336 |
| 2013/0242824 A1* | 9/2013 | Lee | H04L 1/1819 370/281 |
| 2014/0334389 A1 | 11/2014 | Ayman Ahmed Mahmoud et al. | |
| 2015/0105084 A1 | 4/2015 | Bontu et al. | |
| 2015/0282213 A1* | 10/2015 | Sun | H04W 72/0413 370/329 |
| 2016/0037402 A1* | 2/2016 | Rosa | H04W 36/0061 370/331 |
| 2016/0057783 A1* | 2/2016 | Rosa | H04W 74/0833 370/329 |
| 2016/0219620 A1* | 7/2016 | Lee | H04W 76/14 370/328 |
| 2017/0055265 A1* | 2/2017 | Wei | H04W 72/0453 370/328 |
| 2017/0303240 A1* | 10/2017 | Basu Mallick | H04W 76/14 370/328 |
| 2017/0367059 A1* | 12/2017 | Park | H04W 56/001 370/329 |
| 2018/0139651 A1* | 5/2018 | Kim | H04L 5/00 370/328 |

OTHER PUBLICATIONS

Nokia: "Non contention based HO", 11-15 3GPP Draft; R2-071253 Non Contention Based HO, 3rd Generation Partnership Project (3GPP), Mobile Competence Centre ; 650, Route Des Lucioles ; F-06921 Sophia-Antipolis Cedex ; France, vol. RAN WG2, No. St. Julian; Mar. 22, 2007, Dtd Mar. 22, 2007, XP050134214.

3GPP; TSG RAN WG 1 Meeting#44 RI-060560, Random Access and UL Sync 1-14, 24-35 Considerations and Discussion OfLI Questions From Ran2, Feb. 17, 2006 (Feb. 17, 2006 ), chapter 3.

3GPP; TSG-RAN WG 1 #43 RI-051391, Random Access Transmission for Scalable Multiple Bandwidths in Evolved Utra Uplink, Nov. 11, 2005 (Nov. 11, 2005), chapter 3.3.

Chang Chia-Wei et al: "Scattering random-access intensity in LTE Machine-to-Machine (M2M) communications", 2013 IEEE Globecom Workshops (GC WKSHPS), IEEE,Dec. 9, 2013 (Dec. 9, 2013), pp. 4729-4734, XP032619430, DOI: 10.1109/GLOCOMW.2013. 6855698 [retrieved on Jul. 14, 2014] Section II.

Ericsson: "Initial, Random Access and Identity Handling",3GPP Draft; R2-060592, 3rd Generation Partnership Project (3GPP), Mobile Competence Centre ; 650, Route Des Lucioles ; F-06921 Sophia-Antipolis Cedex; France, vol. RAN WG2, No. Denver, USA; Feb. 9, 2006, Feb. 9, 2006 (Feb. 9, 2006), XP050130549, [retrieved on Feb. 9, 2006].

Nokia:"RACH Message Structure", 3GPP Draft; R2-060821 RACH Content, 3rd Generation Partnership Project (3GPP), Mobile Competence Centre ; 650, Route Des Lucioles ; F-06921 Sophia-Antipolis Cedex; France,vol. RAN WG2, No. Athens, Greece; Mar. 23, 2006, Mar. 23, 2006 (Mar. 23, 2006), XP050130984, [retrieved on Mar. 23, 2006].

\* cited by examiner

RANDOM ACCESS METHOD AND EQUIPMENT

This application is a US National Stage of International Application No. PCT/CN2016/076985, filed on Mar. 22, 2016, designating the United States, and claiming the benefit of Chinese Patent Application No. 201510312744.1, filed with the Chinese Patent Office on Jun. 9, 2015 and entitled "Method and device for a random access", which is hereby incorporated by reference in its entirety.

FIELD

The present invention relates to the field of communications, and particularly to a method and device for a random access.

BACKGROUND

A random access in a Long Term Evolution (LTE) system is categorized into a non-contention based random access and a contention based random access. These two random access procedures will be introduced below respectively.

A procedure of a non-contention based random access generally includes three steps.

1. An eNB allocates for a User Equipment (UE) a dedicated Random Access Preamble (ra-PreambleIndex) for a non-contention based random access, and a Physical Random Access Channel (PRACH) resource for a random access;

2. The UE transmits a specified dedicated preamble to the eNB over the specified PRACH resource according to the indicated ra-PreambleIndex, and the PRACH resource for a random access. The eNB calculates an uplink Timing Advance (TA) upon reception of the preamble.

3. The eNB transmits to the UE a random access response, the random access response including information about the timing advance, and a subsequent uplink transmission resource allocation uplink grant, where a timing relationship for subsequent uplink transmission by the UE is defined according to the timing advance.

A procedure of a contention based random access generally includes four steps.

1. A UE selects a random access preamble and a PRACH resource, and transmits the selected random access preamble to an eNB over the PRACH resource.

2. The eNB receives the preamble, calculates a Timing Advance (TA), and transmits to the UE a random access response, random access response at least including information about the timing advance, and an UL grant.

3. The UE transmits uplink data over the specified UL grant.

4. A contention resolution message is transmitted, and the UE may determine according to the Msg4 whether the random access succeeds.

A small cell may be provided with a deployed hotspot in a high frequency band (e.g., 5.9 GHz) in a future communication system (e.g., a 5G system).

There may be the following operating modes of the small cell in the high-frequency band.

In a first mode which is a standalone mode, the cell may operate as a standalone cell to allow a UE to access and reside separately.

In a second mode which is a non-standalone mode, the cell operates only as a resource, and does not allow a UE to access and reside separately.

There are so many interaction stages in the existing random access procedure that may increase a delay of the random access, thus failing to accommodate an application scenario of the small cell at high frequencies.

In summary, there is such a long delay in the existing random access procedure that hinders it from being applied to a scenario having a strict requirement of delay.

SUMMARY

Embodiments of the invention provide a method and device for a random access so as to address the problem in the prior art that there is such a long delay in a random access procedure that hinders it from being applied to a scenario having a strict requirement of delay.

An embodiment of the invention provides a method for a random access, where the method includes:

determining, by a user equipment, a dedicated contention resource pool for a random access when the user equipment accesses a cell;

transmitting, by the user equipment, identification information of the user equipment to the cell over a resource in the dedicated contention resource pool for a random access; and receiving, by the user equipment, a contention resolution message from the cell, and determining whether the random access succeeds, according to the contention resolution message.

Optionally the determining, by the user equipment, the dedicated contention resource pool for a random access includes:

determining, by the user equipment, the dedicated contention resource pool for a random access according to first resource information broadcasted by the cell.

Optionally the determining, by the user equipment, the dedicated contention resource pool for a random access according to the first resource information broadcasted by the cell includes:

determining, by the user equipment, a plurality of dedicated contention resource pools for a random access according to the first resource information broadcasted by the cell, and selecting one of the dedicated contention resource pools for a random access.

Optionally the transmitting, by the user equipment, the identification information of the user equipment to the cell over the resource in the dedicated contention resource pool for a random access includes:

transmitting, by the user equipment, the identification information of the user equipment to the cell over the resource in the dedicated contention resource pool for a random access based upon downlink timing of the cell.

Optionally if the random access is intended for an initial access of the user equipment, or to reestablish a Radio Resource Control (RRC) connection by the user equipment, then the identification information of the user equipment will be a Common Control Channel (CCCH) Service Data Unit (SDU); or if the random access is intended for uplink synchronization, then the identification information of the user equipment will be a Cell Radio Network Temporary Identifier (C-RNTI) Media Access Control (MAC) Control Element (CE).

Optionally the determining, by the user equipment, whether the random access succeeds, according to the contention resolution message includes:

if a CCCH SDU in the contention resolution message is a CCCH SDU transmitted to the cell, then determining that the random access succeeds; otherwise, determining that the random access fails; and if the contention resolution message includes a PDCCH addressed using a C-RNTI MAC CE transmitted to the cell, then determining that the random access succeeds; otherwise, determining that the random access fails.

Optionally after the user equipment determines the dedicated contention resource pool for a random access when accessing the cell, the method further includes:

if a capacity of the determined dedicated contention resource pool for a random access is greater than a first threshold, then transmitting, by the user equipment, BSR information, and/or a part or all of data to be transmitted, to the cell.

Optionally the receiving, by the user equipment, the contention resolution message includes:

if the random access of the user equipment is intended for an initial access or to reestablish an RRC connection, then receiving, by the user equipment, the contention resolution message over a resource pool corresponding to second resource information broadcasted by the cell, or receiving the contention resolution message over a resource scheduled using a CB-RNTI; and if the random access of the user equipment is for uplink synchronization, then receiving, by the user equipment, the contention resolution message over a Physical Downlink Shared Channel (PDSCH) resource scheduled by a Physical Downlink Control Channel (PDCCH) addressed using a C-RNTI.

Optionally the method further includes:

if the user equipment does not receive the contention resolution message in a contention resolution time window, then reselecting a dedicated contention resource pool for a random access, and initiating a random access again, after waiting for a period of time randomly.

An embodiment of the invention provides a method for a random access, where the method includes:

broadcasting, by a cell, first resource information for determining a dedicated contention resource pool for a random access;

receiving, by the cell, identification information of a user equipment, transmitted by the user equipment to access the cell, over the dedicated contention resource pool for a random access corresponding to the information about the dedicated contention resource pool for a random access; and transmitting, by the cell, a contention resolution message to the user equipment upon reception of the identification information of the user equipment.

Optionally the broadcasting, by the cell, the first resource information for determining the dedicated contention resource pool for a random access includes:

broadcasting, by the cell, the first resource information in an SIB;

where the SIB is a new SIB different from that in the existing 3GPP TS 36.331, or an SIB obtained by extending the SIB in the 3GPP TS 36.331.

Optionally after the cell receives the identification information of the user equipment, the method further includes:

if the user equipment makes an initial access or establishes an RRC connection, then allocating, by the cell, a C-RNTI for the user equipment.

Optionally after the cell receives the identification information of the user equipment, the method further includes:

if a radius of the cell is greater than a second threshold, then configuring, by the cell, uplink TA available in the cell for the user equipment.

Optionally if the user equipment makes an initial access or establishes an RRC connection, then the contention resolution message will include the identification information of the user equipment; and if the random access of the user equipment is intended for uplink synchronization, then the contention resolution message will be PDCCH scheduling information, including an initial transmission uplink grant, for a C-RNTI of the user equipment.

Optionally transmitting, by the cell, the contention resolution message to the user equipment includes:

if the random access of the user equipment is intended for an initial access or to reestablish an RRC connection, then transmitting, by the cell, the contention resolution message to the user equipment over a resource pool corresponding to second resource information broadcasted by the cell, or transmitting the contention resolution message to the user equipment over a resource scheduled using a CB-RNTI; and if the random access of the user equipment is intended for uplink synchronization, then transmitting, by the cell, the contention resolution message to the user equipment over a PDSCH resource scheduled by a PDCCH addressed using a C-RNTI.

Optionally the broadcasting, by the cell, the second resource information includes:

broadcasting, by the cell, the second resource information in an SIB; where the SIB is a new SIB different from that in the existing 3GPP TS 36.331, or an SIB obtained by extending the SIB in the 3GPP TS 36.331.

An embodiment of the invention provides a method for a random access, where the method includes:

obtaining, by a user equipment to be switched, second resource information over a source cell;

determining, by the user equipment, an uplink transmission dedicated resource allocated by a target cell for the user equipment, according to the second resource information; and accessing, by the user equipment, the target cell over the uplink transmission dedicated resource.

Optionally the obtaining, by the user equipment, the second resource information over the source cell includes:

obtaining, by the user equipment, the second resource information in an RRC Reconfigure message transmitted by the source cell; and the accessing, by the user equipment, the target cell over the uplink transmission dedicated resource includes:

transmitting, by the user equipment, an RRC Reconfigure Complete message to the target cell over the uplink transmission dedicated resource.

An embodiment of the invention provides a method for a random access, where the method includes:

determining, by a target cell, an uplink transmission dedicated resource for a user equipment to be switched; and notifying, by the target cell, a source cell of the allocated uplink transmission dedicated resource so that the source cell notifies the user equipment of the uplink transmission dedicated resource, and the user equipment accesses the target cell over the uplink transmission dedicated resource.

Optionally before the target cell allocates the uplink transmission dedicated resource for the user equipment to be switched, the method further includes:

receiving, by the target cell, a Handover Request message from the source cell.

Optionally the notifying, by the target cell, the source cell of the allocated uplink transmission dedicated resource includes:

notifying, by the target cell, the source cell of second resource information corresponding to the allocated uplink transmission dedicated resource via an X2 interface.

Optionally the notifying, by the target cell, the source cell of the allocated uplink transmission dedicated resource includes:

notifying, by the target cell, the source cell of the allocated uplink transmission dedicated resource via a Handover Request Acknowledge message.

Optionally after the target cell notifies the source cell of the allocated uplink transmission dedicated resource, the method further includes:

notifying, by the target cell, the user equipment of an uplink TA in the target cell over a PDCCH addressed based upon a C-RNTI of the UE upon reception of an RRC Reconfigure Complete message transmitted by the user equipment.

An embodiment of the invention provides a method for a random access, where the method includes:

transmitting, by a source cell, a Handover Request message to a target cell when a user equipment needs to be switched; and notifying, by the source cell, the user equipment of an uplink transmission dedicated resource allocated by a target cell for the user equipment so that the user equipment accesses the target cell over the uplink transmission dedicated resource.

Optionally the notifying, by the source cell, the user equipment of the uplink transmission dedicated resource allocated by the target cell for the user equipment includes:

notifying, by the source cell, the user equipment of the uplink transmission dedicated resource allocated by the target cell for the user equipment via an RRC Reconfigure message including mobility control information.

An embodiment of the invention provides a user equipment for a random access, where the user equipment includes:

a first determining module configured to determine a dedicated contention resource pool for a random access when accessing a cell;

a first transmitting module configured to transmit identification information of the user equipment to the cell over a resource in the dedicated contention resource pool for a random access; and a first accessing module configured to receive a contention resolution message from the cell, and determine whether the random access succeeds, according to the contention resolution message.

Optionally the first determining module is configured to:

determine the dedicated contention resource pool for a random access according to first resource information broadcasted by the cell.

Optionally the first determining module is configured to:

determine a plurality of dedicated contention resource pools for a random access according to the first resource information broadcasted by the cell, and select one of the dedicated contention resource pools for a random access.

Optionally the first determining module is configured to:

transmit the identification information of the user equipment to the cell over the resource in the dedicated contention resource pool for a random access based upon downlink timing of the cell.

Optionally if the random access is intended for an initial access of the user equipment, or to reestablish an RRC connection by the user equipment, then the identification information of the user equipment will be a CCCH SDU; and if the random access is intended for uplink synchronization, then the identification information of the user equipment will be a C-RNTI MAC CE.

Optionally the first accessing module is configured:

if a CCCH SDU in the contention resolution message is a CCCH SDU transmitted to the cell, to determine that the random access succeeds; otherwise, to determine that the random access fails; and if the contention resolution message includes a PDCCH addressed using a C-RNTI MAC CE transmitted to the cell, to determine that the random access succeeds; otherwise, to determine that the random access fails.

Optionally the first transmitting module is configured:

upon determining the dedicated contention resource pool for a random access when accessing the cell, if a capacity of the determined dedicated contention resource pool for a random access is greater than a first threshold, to transmit BSR information, and/or a part or all of data to be transmitted, to the cell.

Optionally the first accessing module is configured:

if the random access of the user equipment is intended for an initial access or to reestablish an RRC connection, to receive the contention resolution message over a resource pool corresponding to second resource information broadcasted by the cell, or receive the contention resolution message over a resource scheduled using a CB-RNTI; and if the random access of the user equipment is for uplink synchronization, to receive the contention resolution message over a PDSCH resource scheduled by a PDCCH addressed using a C-RNTI.

Optionally the first accessing module is further configured:

if the user equipment does not receive the contention resolution message in a contention resolution time window, to trigger the first determining module to reselect a dedicated contention resource pool for a random access, and to initiate a random access again, after waiting for a period of time randomly.

An embodiment of the invention provides a network-side device for a random access, where the network-side device includes:

a broadcasting module configured to broadcast first resource information for determining a dedicated contention resource pool for a random access;

a first receiving module configured to receive identification information of a user equipment, transmitted by the user equipment to access a cell managed by the network-side device, over the dedicated contention resource pool for a random access corresponding to the information about the dedicated contention resource pool for a random access; and a first transmitting module configured to transmit a contention resolution message to the user equipment upon reception of the identification information of the user equipment.

Optionally the broadcasting module is configured to:

broadcast the first resource information in an SIB;

where the SIB is a new SIB different from that in the existing 3GPP TS 36.331, or an SIB obtained by extending the SIB in the 3GPP TS 36.331.

Optionally the first receiving module is further configured:

upon reception of the identification information of the user equipment, if the user equipment makes an initial access or establishes an RRC connection, to allocate a C-RNTI for the user equipment.

Optionally the first receiving module is further configured:

if a radius of the cell is greater than a second threshold, to configure uplink TA available in the cell for the user equipment.

Optionally if the user equipment makes an initial access or establishes an RRC connection, then the contention resolution message will include the identification information of the user equipment; and if the random access of the user equipment is intended for uplink synchronization, then the contention resolution message will be PDCCH scheduling information, including an initial transmission uplink grant, for a C-RNTI of the user equipment.

Optionally the first transmitting module is configured:

if the random access of the user equipment is intended for an initial access or to reestablish an RRC connection, to transmit the contention resolution message to the user equipment over a resource pool corresponding to second resource information broadcasted by the cell, or to transmit the contention resolution message to the user equipment over a resource scheduled using a CB-RNTI; and if the random access of the user equipment is intended for uplink synchronization, to transmit the contention resolution message to the user equipment over a PDSCH resource scheduled by a PDCCH addressed using a C-RNTI.

Optionally the broadcasting module is configured to:

broadcast the second resource information in an SIB;

where the SIB is a new SIB different from that in the existing 3GPP TS 36.331, or an SIB obtained by extending the SIB in the 3GPP TS 36.331.

An embodiment of the invention provides another user equipment for a random access, where the user equipment includes:

an obtaining module configured to obtain second resource information over a source cell when the user equipment needs to be switched;

a second determining module configured to determine an uplink transmission dedicated resource allocated by a target cell for the user equipment, according to the second resource information; and a second accessing module configured to access the target cell over the uplink transmission dedicated resource.

Optionally the obtaining module is configured to:

obtain the second resource information in an RRC Reconfigure message transmitted by the source cell; and the second accessing module is configured to:

transmit an RRC Reconfigure Complete message to the target cell over the uplink transmission dedicated resource.

An embodiment of the invention provides a target network-side device for a random access, where the target network-side device includes:

an allocating module configured to allocate an uplink transmission dedicated resource for a user equipment to be switched; and a second transmitting module configured to notify a source cell of the allocated uplink transmission dedicated resource so that the source cell notifies the user equipment of the uplink transmission dedicated resource, and the user equipment accesses a target cell over the uplink transmission dedicated resource.

Optionally the allocating module is configured to:

allocate the uplink transmission dedicated resource for the user equipment to be switched, upon reception of a Handover Request message from the source cell.

Optionally the second transmitting module is configured to:

notify the source cell of second resource information corresponding to the allocated uplink transmission dedicated resource via an X2 interface.

Optionally the second transmitting module is configured to:

notify the source cell of the allocated uplink transmission dedicated resource in a Handover Request Acknowledge message.

Optionally the second transmitting module is further configured:

after notifying the source cell of the allocated uplink transmission dedicated resource, to notify the user equipment of an uplink TA in the target cell over a PDCCH addressed based upon a C-RNTI of the UE upon reception of an RRC Reconfigure Complete message transmitted by the user equipment.

An embodiment of the invention provides a source network-side device for a random access, where the source network-side device includes:

a third transmitting module configured to transmit a Handover Request message to a target cell when a user equipment needs to be switched; and a fourth transmitting module configured to notify the user equipment of an uplink transmission dedicated resource allocated by the target cell for the user equipment so that the user equipment accesses the target cell over the uplink transmission dedicated resource.

Optionally the fourth transmitting module is configured to:

notify the user equipment of the uplink transmission dedicated resource allocated by the target cell for the user equipment via an RRC Reconfigure message including mobility control information.

In the contention based random access procedure according to the embodiments of the invention, the user equipment transmits the identification information of the user equipment to the cell over the resource in the dedicated contention resource pool for a random access; and if the user equipment receives the contention resolution message from the cell, then it will determine whether the random access succeeds, according to the contention resolution message. In the non-contention based random access procedure according to the embodiments of the invention, the user equipment determines the uplink transmission dedicated resource allocated by the target cell for the user equipment, according to the second resource information; and accesses the target cell over the uplink transmission dedicated resource. The number of interaction stages in the random access procedure may be reduced to thereby shorten a delay of the random access, so that it can be applied to a scenario having a strict requirement of delay.

DETAILED DESCRIPTION OF THE EMBODIMENTS

In a contention based random access procedure according to the embodiments of the invention, a user equipment transmits identification information of the user equipment to a cell over a resource in a dedicated contention resource pool for a random access; and if the user equipment receives a contention resolution message from the cell, then it will determine whether the random access succeeds according to the contention resolution message. In a non-contention based random access procedure according to the embodiments of the invention, a user equipment determines an uplink transmission dedicated resource allocated by a target cell for the user equipment, according to second resource information; and accesses the target cell over the uplink transmission dedicated resource. The number of interaction stages in the random access procedure can be reduced to thereby shorten a delay of the random access, so that it can be applied to a scenario having a strict requirement of delay.

The embodiments of the invention provide two random access solutions, i.e., a contention based random access solution and a non-contention based random access solution.

Here reference may be made to FIG. 1 to FIG. 9 for the contention based random access solution, and reference may be made to FIG. 10 to FIG. 19 for the non-contention based random access solution.

The embodiments of the invention will be described below in further details with reference to the drawings.

Figure 1:
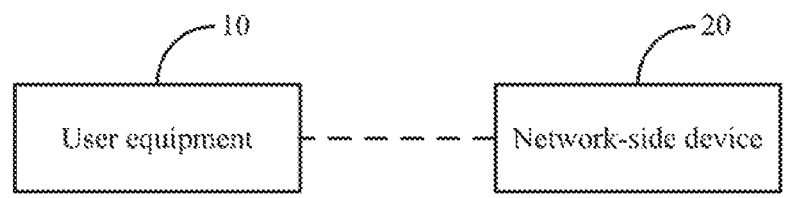
FIG. 1 is a schematic structural diagram of a first system for a random access according to an embodiment of the invention.

As illustrated in FIG. 1, a first system for a random access according to an embodiment of the invention includes a user equipment 10, and a network-side device 20 managing cells.

The user equipment 10 is configured determine a dedicated contention resource pool for a random access when accessing a cell; transmit identification information of the user equipment to the cell over a resource in the dedicated contention resource pool for a random access; and receive a contention resolution message from the cell, and determine whether the random access succeeds, according to the contention resolution message.

The network-side device 20 is configured to broadcast first resource information for determining the dedicated contention resource pool for a random access; receive the identification information of the user equipment transmitted by the user equipment to access the cell managed by the network-side device, over the dedicated contention resource pool for a random access corresponding to the information about the dedicated contention resource pool for a random access; and transmit the contention resolution message to the user equipment.

If the network-side device receives the identification information of the user equipment, then it will determine that the corresponding user equipment succeeds in contention, and transmit the contention resolution message to the corresponding user equipment.

Correspondingly if the user equipment receives the contention resolution message, then it will determine that the random access succeeds.

In an implementation, the network-side device broadcasts the first resource information corresponding to at least one dedicated contention resource pool for a random access in the managed cell, and the UE to access the cell firstly reads the broadcasted message and obtains the first resource information, and then transmits the identification information of the UE over the resource in the dedicated contention resource pool for a random access corresponding to the first resource information. If the network-side device receives the identification information of the UE successfully, then it will determine that the UE succeeds in contention, and transmit the contention resolution message to the UE.

In the embodiment of the invention, the first resource information for determining the dedicated contention resource pool for a random access is broadcasted by the cell by broadcasting the first resource information in an SIB.

Here the SIB is a new SIB different from that in the existing 3GPP TS 36.331, or a System Information Block (SIB) obtained by extending the SIB in the $3^{rd}$ Generation partnership Project (3GPP) Technical Specification (TS) 36.331.

Here the first resource information may include but will not be limited to a part or all of the following information: a time-frequency position corresponding to the dedicated contention resource pool for a random access, an allowable Modulation and Coding Scheme (MCS) level, and a priority.

The user equipment may determine the dedicated contention resource pool for a random access according to the time-frequency resources upon reception of the first resource information which is broadcasted.

If there are a plurality of dedicated contention resource pools for a random access, then the user equipment may determine the corresponding dedicated contention resource pools for a random access according to the respective time-frequency positions.

If there is an MCS level, then the user equipment may determine a modulation and coding scheme for transmitting the identification information of the user equipment, according to the MCS level.

If there are a plurality of dedicated contention resource pools for a random access, then the user equipment may select a dedicated contention resource pool for a random access with the highest priority according to the priorities corresponding to the respective dedicated contention resource pools for a random access.

In an implementation, after the dedicated contention resource pool for a random access is determined, the user equipment may transmit the identification information of the user equipment to the cell over the resource in the dedicated contention resource pool for a random access based upon downlink timing of the cell. Stated otherwise, the identification information of the user equipment is transmitted to the cell over the resource in the dedicated contention resource pool for a random access at a downlink receive instance of time of the cell.

Optionally the identification information of the user equipment in the embodiment of the invention may be the following information.

If the random access is intended for an initial access of the user equipment or to reestablish a Radio Resource Control (RRC) connection by the user equipment, then the identification information of the user equipment will be a Common Control Channel (CCCH) Service Data Unit (SDU); or the identification information of the user equipment may be other information capable of identifying the user equipment.

If the random access is intended for uplink synchronization, then the identification information of the user equipment will be a Cell Radio Network Temporary Identifier (C-RNTI) Media Access Control (MAC) Control Element (CE); or the identification information of the user equipment may be other information capable of identifying the user equipment.

Correspondingly the user equipment determines whether the random access succeeds, according to the contention resolution message as follows.

If a CCCH SDU in the contention resolution message is a CCCH SDU transmitted to the cell, then the user equipment will determine that the random access succeeds; otherwise, it will determine that the random access fails.

If the contention resolution message includes a Physical Downlink Control Channel (PDCCH) addressed based upon a C-RNTI MAC CE transmitted to the cell, then the user equipment will determine that the random access succeeds; otherwise, it will determine that the random access fails.

Optionally if the user equipment determines that the random access fails, then it may reselect a dedicated contention resource pool for a random access, and initiate a random access again, after waiting for a period of time randomly.

In an implementation, the number of attempts at a random access may be set, and before the number of attempts is reached, the random access will be retried until it succeeds; and if the number of attempts is reached, then the random access will be stopped.

Optionally if the capacity of the dedicated contention resource pool for a random access determined by the user equipment is greater than a first threshold, then the user equipment will transmit Buffer Status Report (BSR) information, and/or a part or all of data to be transmitted, to the cell.

The first threshold here may be determined empirically, as a result of simulation, as demanded, etc.

If the user equipment makes an initial access or establishes an RRC connection, then the network-side device may further allocate a C-RNTI for the user equipment upon determining that the user equipment succeeds in contention.

Optionally the network-side device may allocate the C-RNTI for the user equipment via the contention resolution message; or may allocate the C-RNTI for the user equipment via another message.

In an implementation, if the radius of the cell is greater than a second threshold, then the network-side device may further configure an uplink TA available in the cell for the user equipment upon determining that the user equipment succeeds in contention.

The second threshold here may be determined empirically, as a result of simulation, as demanded, etc. For example, the second threshold may be set to the size of a Timing Advance (TA) adjustment step. At present, the size of a TA adjustment step is 78 m.

Optionally the network-side device may allocate the TA for the user equipment via the contention resolution message; or may allocate the TA for the user equipment via another message.

In an implementation, if the random access of the user equipment is intended for an initial access or to reestablish an RRC connection, then the network-side device may put the received identification information of the user equipment in the contention resolution message. Optionally the network-side device may put the C-RNTI and/or the TA allocated for the user equipment in the contention resolution message.

If the random access of the user equipment is intended for uplink synchronization, then the network-side device will transmit the contention resolution message to the user equipment over a Physical Downlink Shared Channel (PDSCH) resource scheduled by a PDCCH addressed using a C-RNTI. Optionally the network-side device may further put the TA allocated for the user equipment in the contention resolution message.

Optionally the network-side device transmits the contention resolution message to the user equipment as follows.

If the random access of the user equipment is intended for an initial access or to reestablish an RRC connection, then the cell will transmit the contention resolution message to the user equipment over a resource pool corresponding to second resource information broadcasted by the cell, or transmit the contention resolution message to the user equipment over a resource scheduled using a Contention Based Radio Network Temporary Identity (CB-RNTI).

Correspondingly the user equipment receives the contention resolution message over the resource pool corresponding to the second resource information broadcasted by the cell; or receives the contention resolution message over the resource scheduled using the CB-RNTI.

Optionally the cell broadcasts the second resource information by broadcasting the second resource information in an SIB.

Here the SIB is a new SIB different from that in the existing 3GPP TS 36.331, or an SIB obtained by extending the SIB in the 3GPP TS 36.331.

If the random access of the user equipment is intended for uplink synchronization, then the cell will transmit the contention resolution message to the user equipment over a PDSCH resource scheduled by a PDCCH addressed using a C-RNTI.

Correspondingly the user equipment receives the contention resolution message over the PDSCH resource scheduled by the PDCCH addressed using the C-RNTI.

Optionally the network-side device may configure a contention resolution time window for the user equipment via broadcast or dedicated signaling (the dedicated signaling is applicable to the case in which user equipment has established an RRC connection).

Correspondingly if the user equipment receives the contention resolution message in the contention resolution time window, then it will determine that it succeeds in contention.

If the user equipment does not receive the contention resolution message in the contention resolution time window, then it will reselect a dedicated contention resource pool for a random access, and initiate a random access again, after waiting for a period of time randomly.

Figure 2:
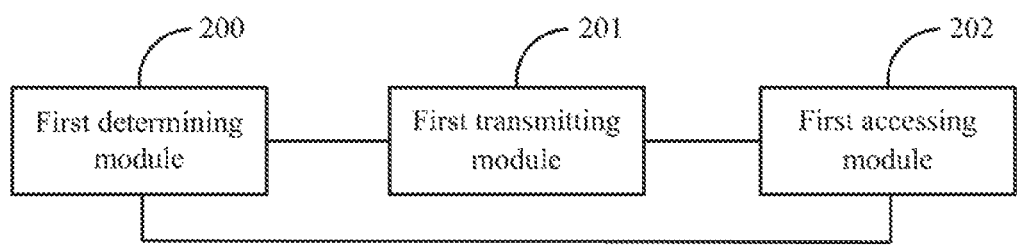
FIG. 2 is a schematic structural diagram of a first user equipment according to an embodiment of the invention.

As illustrated in FIG. 2, a first user equipment according to an embodiment of the invention includes: a first determining module 200 configured to determine a dedicated contention resource pool for a random access when accessing a cell; a first transmitting module 201 configured to transmit identification information of the user equipment to the cell over a resource in the dedicated contention resource pool for a random access; and a first accessing module 202 configured to receive a contention resolution message from the cell, and determine whether the random access succeeds, according to the contention resolution message.

Optionally the first determining module 200 is configured to: determine the dedicated contention resource pool for a random access according to first resource information broadcasted by the cell.

Optionally the first determining module 200 is configured to: determine a plurality of dedicated contention resource pools for a random access according to the first resource information broadcasted by the cell, and select one of the dedicated contention resource pools for a random access.

Optionally the first transmitting module 201 is configured to: transmit the identification information of the user equipment to the cell over the resource in the dedicated contention resource pool for a random access based upon downlink timing of the cell.

Optionally if the random access is intended for an initial access of the user equipment, or to reestablish an RRC connection by the user equipment, then the identification information of the user equipment will be a CCCH SDU; and If the random access is intended for uplink synchronization, then the identification information of the user equipment will be a C-RNTI MAC CE.

Optionally the first accessing module 202 is configured: if a CCCH SDU in the contention resolution message is a CCCH SDU transmitted to the cell, to determine that the random access succeeds; otherwise, to determine that the random access fails; and If the contention resolution message includes a PDCCH addressed using a C-RNTI MAC CE transmitted to the cell, to determine that the random access succeeds; otherwise, to determine that the random access fails.

Optionally the first transmitting module 201 is configured: upon determining the dedicated contention resource pool for a random access when accessing the cell, if the capacity of the determined dedicated contention resource pool for a random access is greater than a first threshold, to transmit BSR information, and/or a part or all of data to be transmitted, to the cell.

Optionally the first accessing module 202 is configured: if the random access of the user equipment is intended for an initial access or to reestablish an RRC connection, to receive the contention resolution message over a resource pool corresponding to second resource information broadcasted by the cell, or to receive the contention resolution message over a resource scheduled using a CB-RNTI; and if the random access of the user equipment is for uplink synchronization, to receive the contention resolution message over a PDSCH resource scheduled by a PDCCH addressed using a C-RNTI.

Optionally the first accessing module 202 is further configured: if the user equipment does not receive the contention resolution message in a contention resolution time window, to trigger the first determining module to reselect a dedicated contention resource pool for a random access, and to initiate a random access again, after waiting for a period of time randomly.

Figure 3:
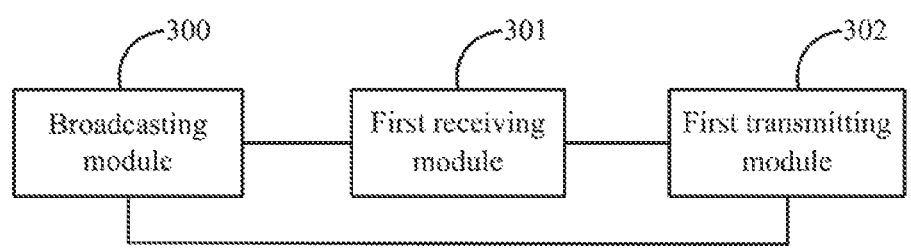
FIG. 3 is a schematic structural diagram of a first network-side device according to an embodiment of the invention.

As illustrated in FIG. 3, a first network-side device according to an embodiment of the invention includes: a broadcasting module 300 configured to broadcast first resource information for determining a dedicated contention resource pool for a random access; a first receiving module 301 configured to receive identification information of a user equipment, transmitted by the user equipment to access a cell managed by the network-side device, over the dedicated contention resource pool for a random access corresponding to the information about the dedicated contention resource pool for a random access; and a first transmitting module 302 configured to transmit a contention resolution message to the user equipment upon reception of the identification information of the user equipment.

Optionally the broadcasting module 300 is configured to broadcast the first resource information in an SIB; here the SIB is a new SIB different from that in the existing 3GPP TS 36.331, or an SIB obtained by extending the SIB in the 3GPP TS 36.331.

Optionally the first receiving module 301 is further configured: upon reception of the identification information of the user equipment, if the user equipment makes an initial access or establishes an RRC connection, to allocate a C-RNTI for the user equipment.

Optionally the first receiving module 301 is further configured: upon reception of the identification information of the user equipment, if the radius of the cell is greater than a second threshold, to configure uplink TA available in the cell for the user equipment.

Optionally if the user equipment makes an initial access or establishes an RRC connection, then the contention resolution message will include the identification information of the user equipment; and if the random access of the user equipment is intended for uplink synchronization, then the contention resolution message will be PDCCH scheduling information, including an initial transmission uplink grant, for a C-RNTI of the user equipment.

Optionally the first transmitting module 302 is configured: if the random access of the user equipment is intended for an initial access or to reestablish an RRC connection, to transmit the contention resolution message to the user equipment over a resource pool corresponding to second resource information broadcasted by the cell, or to transmit the contention resolution message to the user equipment over a resource scheduled using a CB-RNTI; and if the random access of the user equipment is intended for uplink synchronization, to transmit the contention resolution message to the user equipment over a PDSCH resource scheduled by a PDCCH addressed using a C-RNTI.

Optionally the broadcasting module 300 is configured to broadcast the second resource information in an SIB; here the SIB is a new SIB different from that in the existing 3GPP TS 36.331, or an SIB obtained by extending the SIB in the 3GPP TS 36.331.

Figure 4:
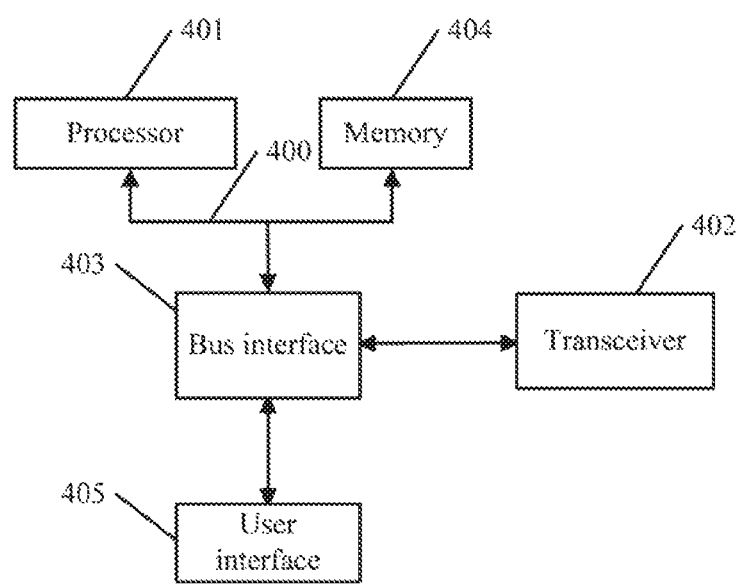
FIG. 4 is a schematic structural diagram of a second user equipment according to an embodiment of the invention.

As illustrated in FIG. 4, a second user equipment according to an embodiment of the invention includes: a processor 401 configured to read programs in a memory 404 to: determine a dedicated contention resource pool for a random access when accessing a cell; transmit identification information of the user equipment to the cell over a resource in the dedicated contention resource pool for a random access through a transceiver 402; and receive a contention resolution message from the cell through the transceiver 402, and determine whether the random access succeeds, according to the contention resolution message; and the transceiver 402 configured to be controlled by the processor 401 to receive and transmit data.

Optionally the processor 401 is configured to: determine the dedicated contention resource pool for a random access according to first resource information broadcasted by the cell.

Optionally the processor 401 is configured to: determine a plurality of dedicated contention resource pools for a random access according to the first resource information broadcasted by the cell, and select one of the dedicated contention resource pools for a random access.

Optionally the processor 401 is configured to: transmit the identification information of the user equipment to the cell over the resource in the dedicated contention resource pool for a random access based upon downlink timing of the cell.

Optionally if the random access is intended for an initial access of the user equipment, or to reestablish an RRC connection by the user equipment, then the identification information of the user equipment will be a CCCH SDU; and if the random access is intended for uplink synchronization, then the identification information of the user equipment will be a C-RNTI MAC CE.

Optionally the processor 401 is configured: if a CCCH SDU in the contention resolution message is a CCCH SDU transmitted to the cell, to determine that the random access succeeds; otherwise, to determine that the random access fails; and if the contention resolution message includes a PDCCH addressed using a C-RNTI MAC CE transmitted to the cell, to determine that the random access succeeds; otherwise, to determine that the random access fails.

Optionally the processor 401 is configured: upon determining the dedicated contention resource pool for a random access when accessing the cell, if the capacity of the determined dedicated contention resource pool for a random access is greater than a first threshold, to transmit BSR information, and/or a part or all of data to be transmitted, to the cell.

Optionally the processor 401 is configured: if the random access of the user equipment is intended for an initial access or to reestablish an RRC connection, to receive the contention resolution message over a resource pool corresponding to second resource information broadcasted by the cell, or to receive the contention resolution message over a resource scheduled using a CB-RNTI; and if the random access of the user equipment is for uplink synchronization, to receive the contention resolution message over a PDSCH resource scheduled by a PDCCH addressed using a C-RNTI.

Optionally the processor 401 is further configured: if the user equipment does not receive the contention resolution message in a contention resolution time window, to trigger the first determining module to reselect a dedicated contention resource pool for a random access, and to initiate a random access again, after waiting for a period of time randomly.

In FIG. 4, the bus architecture is represented as a bus 400, and the bus 400 may include any number of interconnecting buses and bridges to particularly link together various circuits including one or more processors represented by the processor 401, and one or more memories represented by the memory 404. The bus 400 may further link together various other circuits. e.g., peripheral devices, manostats, power management circuits, etc., all of which are well known in the art, so a further description thereof will be omitted in this context. The bus interface 403 serves as an interface between the bus 400 and the transceiver 402. The transceiver 402 may be a number of elements including a transmitter and a receiver which are units for communication with various other devices over a transmission medium. For example, the transceiver 402 receives external data from another device. The transceiver 402 is configured to transmit data processed by the processor 401 to the other device. Dependent upon the nature of a computing system, there may be further provided a user interface 405, e.g., a keypad, a display, a speaker, a microphone, a joystick, etc.

The processor 401 is responsible for managing the bus 400 and performing normal processes, e.g., running a general operating system, and the memory 404 may be configured to store data used by the processor 401 to perform the operations.

Optionally the processor 401 may be a Central Processor (CPU), an Application Specific Integrated Circuit (ASIC), a Field-Programmable Gate Array (FPGA), or a Complex Programmable Logic Device (CPLD).

Figure 5:
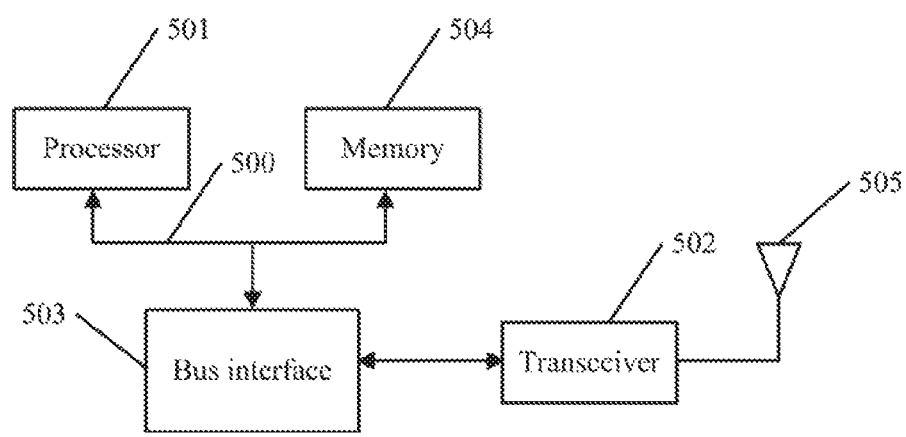
FIG. 5 is a schematic structural diagram of a second network-side device according to an embodiment of the invention.

As illustrated in FIG. 5, a second network-side device according to an embodiment of the invention includes: a processor 501 configured to read programs in a memory 504 to: broadcast first resource information for determining a dedicated contention resource pool for a random access, through a transceiver 502; receive identification information of a user equipment, transmitted by the user equipment to access the cell managed by the network-side device, over the dedicated contention resource pool for a random access corresponding to the information about the dedicated contention resource pool for a random access, through the transceiver 502; and transmit a contention resolution message to the user equipment through the transceiver 502 upon reception of the identification information of the user equipment; and the transceiver 502 configured to be controlled by the processor 501 receive and transmit data.

Optionally the processor 501 is configured to broadcast the first resource information in an SIB; here the SIB is a new SIB different from that in the existing 3GPP TS 36.331, or an SIB obtained by extending the SIB in the 3GPP TS 36.331.

Optionally the processor 501 is further configured: upon reception of the identification information of the user equipment, if the user equipment makes an initial access or establishes an RRC connection, to allocate a C-RNTI for the user equipment.

Optionally the processor 501 is further configured: upon reception of the identification information of the user equipment, if the radius of the cell is greater than a second threshold, to configure the user equipment with uplink TA available in the cell.

Optionally if the user equipment makes an initial access or establishes an RRC connection, then the contention resolution message will include the identification information of the user equipment; and if the random access of the user equipment is intended for uplink synchronization, then the contention resolution message will be PDCCH scheduling information, including an initial transmission uplink grant, for a C-RNTI of the user equipment.

Optionally the processor 501 is configured: if the random access of the user equipment is intended for an initial access or to reestablish an RRC connection, to transmit the contention resolution message to the user equipment over a resource pool corresponding to second resource information broadcasted by the cell, or to transmit the contention resolution message to the user equipment over a resource scheduled using a CB-RNTI; and if the random access of the user equipment is intended for uplink synchronization, to transmit the contention resolution message to the user equipment over a PDSCH resource scheduled by a PDCCH addressed using a C-RNTI.

Optionally the processor 501 is configured to broadcast the second resource information in an SIB; here the SIB is a new SIB different from that in the existing 3GPP TS 36.331, or an SIB obtained by extending the SIB in the 3GPP TS 36.331.

In FIG. 5, the bus architecture is represented as a bus 500, and the bus 500 may include any number of interconnecting buses and bridges to particularly link together various circuits including one or more processors represented by the processor 501, and one or more memories represented by the memory 504. The bus 500 may further link together various other circuits, e.g., peripheral devices, manostats, power management circuits, etc., all of which are well known in the art, so a further description thereof will be omitted in this context. The bus interface 503 serves as an interface between the bus 500 and the transceiver 502. The transceiver 502 may be a number of elements including a transmitter and a receiver which are units for communication with various other devices over a transmission medium. Data processed by the processor 501 are transmitted over the transmission medium through an antenna 505, and furthermore the antenna 505 further receives and transmits data to the processor 501.

The processor 501 is responsible for managing the bus 500 and performing normal processes, and may further provide various functions including timing, a peripheral interface, voltage regulation, power supply management, and other control functions, and the memory 504 may be configured to store data used by the processor 501 to perform the operations.

Optionally the processor 501 may be a CPU, an ASIC, an FPGA, or a CPLD.

Based upon the same inventive idea, embodiments of the invention further provide methods for a random access, and since devices corresponding to the methods are the devices in the system for a random access according to the embodiments of the invention, and the methods address the problem under a similar principle to that of the system, reference may be made to the implementations of the devices for implementations of the methods, so a repeated description thereof will be omitted here.

Figure 6:
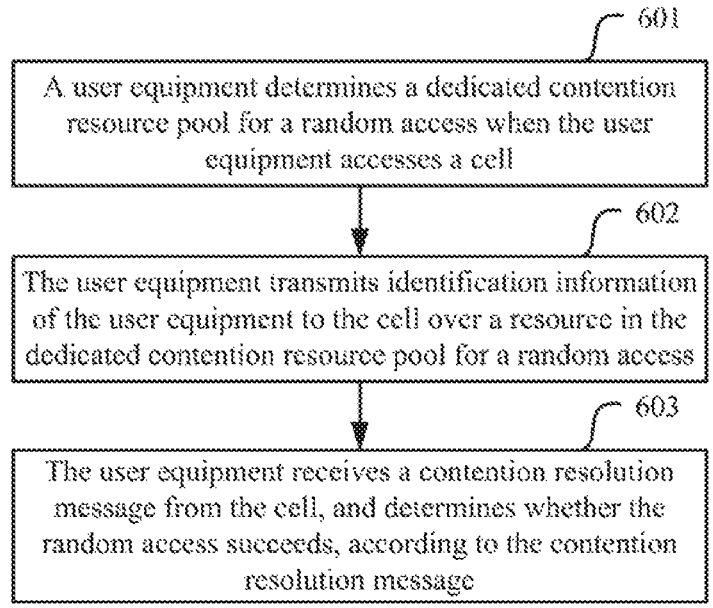
FIG. 6 is a schematic flow chart of a first method for a random access according to an embodiment of the invention.

As illustrated in FIG. 6, a first method for a random access according to an embodiment of the invention includes the following operations.

Operation 601: a user equipment determines a dedicated contention resource pool for a random access when accessing a cell.

Operation 602: the user equipment transmits identification information of the user equipment to the cell over a resource in the dedicated contention resource pool for a random access.

Operation 603: the user equipment receives a contention resolution message from the cell, and determines whether the random access succeeds, according to the contention resolution message.

Optionally the user equipment determines the dedicated contention resource pool for a random access to the cell as follows.

The user equipment determines the dedicated contention resource pool for a random access according to first resource information broadcasted by the cell.

Optionally the user equipment determines the dedicated contention resource pool for a random access according to the first resource information broadcasted by the cell as follows: the user equipment determines a plurality of dedicated contention resource pools for a random access according to the first resource information broadcasted by the cell, and selects one of the dedicated contention resource pools for a random access.

Optionally the user equipment transmits the identification information of the user equipment to the cell over the resource in the dedicated contention resource pool for a random access as follows: the user equipment transmits the identification information of the user equipment to the cell over the resource in the dedicated contention resource pool for a random access based upon downlink timing of the cell.

Optionally if the random access is intended for an initial access of the user equipment, or to reestablish an RRC connection by the user equipment, then the identification information of the user equipment will be a CCCH SDU; and if the random access is intended for uplink synchronization, then the identification information of the user equipment will be a C-RNTI MAC CE.

Optionally the user equipment determines whether the random access succeeds, according to the contention resolution message as follows: if a CCCH SDU in the contention resolution message is a CCCH SDU transmitted to the cell, then the user equipment will determine that the random access succeeds; otherwise, determine that the random access fails; and if the contention resolution message includes a PDCCH addressed using a C-RNTI MAC CE transmitted to the cell, then the user equipment will determine that the random access succeeds; otherwise, determine that the random access fails.

Optionally after the user equipment determines the dedicated contention resource pool for a random access when accessing the cell, the method further includes: if the capacity of the determined dedicated contention resource pool for a random access is greater than a first threshold, then the user equipment will transmit BSR information, and/or a part or all of data to be transmitted, to the cell.

Optionally the user equipment receives the contention resolution message as follows: if the random access of the user equipment is intended for an initial access or to reestablish an RRC connection, then the user equipment will receive the contention resolution message over a resource pool corresponding to second resource information broadcasted by the cell, or receive the contention resolution message over a resource scheduled using a CB-RNTI; and if the random access of the user equipment is for uplink synchronization, then the user equipment will receive the contention resolution message over a PDSCH resource scheduled by a PDCCH addressed using a C-RNTI.

Optionally the method further includes: if the user equipment does not receive the contention resolution message in a contention resolution time window, then the user equipment will reselect a dedicated contention resource pool for a random access, and initiate a random access again, after waiting for a period of time randomly.

In the following description, the cell which is an executor of a method is equivalent to a network-side device managing cells.

Figure 7:
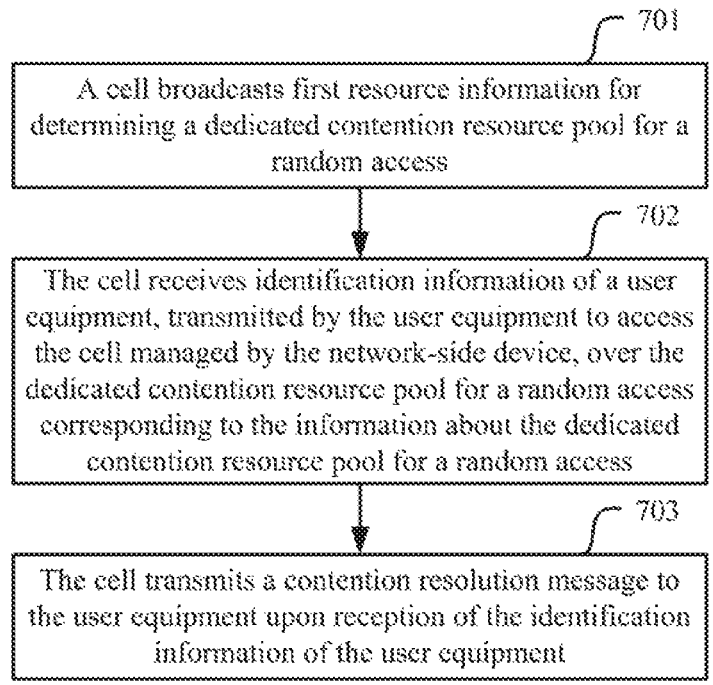
FIG. 7 is a schematic flow chart of a second method for a random access according to an embodiment of the invention.

As illustrated in FIG. 7, a second method for a random access according to an embodiment of the invention includes the following operations.

Operation 701: a cell broadcasts first resource information for determining a dedicated contention resource pool for a random access.

Operation 702: the cell receives identification information of a user equipment, transmitted by the user equipment to access the cell managed by the network-side device, over the dedicated contention resource pool for a random access corresponding to the information about the dedicated contention resource pool for a random access.

Operation 703: the cell transmits a contention resolution message to the user equipment upon reception of the identification information of the user equipment.

Optionally the user equipment determines whether the random access succeeds, according to the contention resolution message as follows.

If a CCCH SDU in the contention resolution message is a CCCH SDU transmitted to the cell, then the user equipment will determine that the random access succeeds; otherwise, it will determine that the random access fails; and if the contention resolution message includes a Physical Downlink Control Channel (PDCCH) addressed based upon a C-RNTI MAC CE transmitted to the cell, then the user equipment will determine that the random access succeeds;

otherwise, it will determine that the random access fails.

Optionally after the cell receives the identification information of the user equipment, the method further includes: if the user equipment makes an initial access or establishes an RRC connection, then the cell will allocate a C-RNTI for the user equipment.

Optionally after the cell receives the identification information of the user equipment, the method further includes: if the radius of the cell is greater than a second threshold, then the cell will configure uplink TA available in the cell for the user equipment.

Optionally if the user equipment makes an initial access or establishes an RRC connection, then the contention resolution message will include the identification information of the user equipment; and if the random access of the user equipment is intended for uplink synchronization, then the contention resolution message will be PDCCH scheduling information, including an initial transmission uplink grant, for a C-RNTI of the user equipment.

Optionally the cell transmits the contention resolution message to the user equipment as follows.

If the random access of the user equipment is intended for an initial access or to reestablish an RRC connection, then the cell will transmit the contention resolution message to the user equipment over a resource pool corresponding to second resource information broadcasted by the cell, or transmit the contention resolution message to the user equipment over a resource scheduled using a CB-RNTI; and if the random access of the user equipment is intended for uplink synchronization, then the cell will transmit the contention resolution message to the user equipment over a PDSCH resource scheduled by a PDCCH addressed using a C-RNTI.

Optionally the cell broadcasts the first resource information for determining the dedicated contention resource pool for a random access as follows: the cell broadcasts the first resource information in an SIB; here the SIB is a new SIB different from that in the existing 3GPP TS 36.331, or an SIB obtained by extending the SIB in the 3GPP TS 36.331.

The solutions according to the invention will be described below in connection with several embodiments thereof.

In a first embodiment, a UE makes an initial access or reestablishes an RRC connection (a contention based random access).

The UE makes an initial access to a cell for the purpose of obtaining a C-RNTI and establishing/reestablishing an RRC connection.

Figure 8:
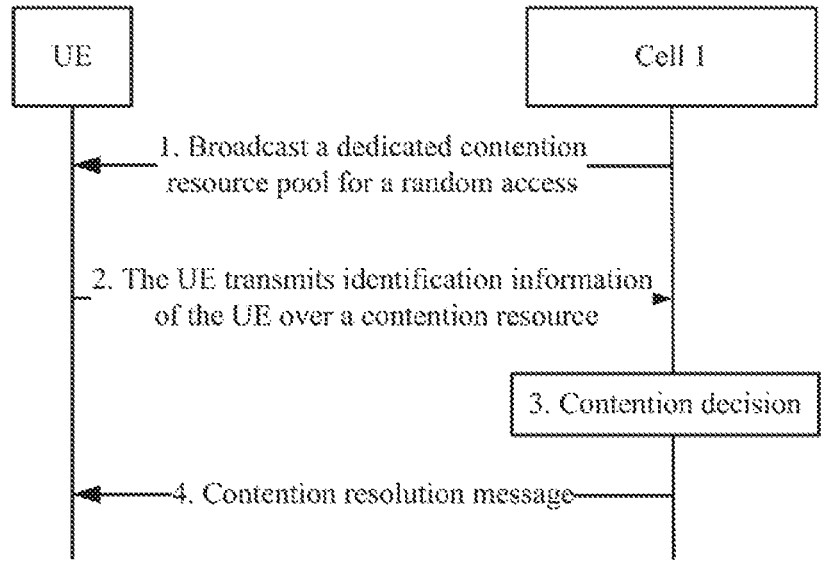
FIG. 8 is a schematic flow chart of a method for an initial access or reestablishing an RRC connection according to an embodiment of the invention.

As illustrated in FIG. 8, a method for making an initial access or reestablishing an RRC connection according to an embodiment of the invention includes the following operations:

In the operation 1, a cell 1 broadcasts resource information for determining a dedicated contention resource pool for a random access, via system information.

Optionally the resource information may include a time-frequency position corresponding to the dedicated contention resource pool for a random access, an allowable MCS level, and a priority.

In the operation 2, a UE to access the cell 1 reads the broadcasted message, and obtains the resource information (e.g., the time-frequency position, the MCS, etc.). If there are a plurality of resource pools configured, then the UE may further select one of the dedicated contention resource pools for a random access according to their corresponding priorities. Then the UE transmits identification information of the UE using the selected dedicated contention resource pool for a random access based upon downlink timing of the cell to which a random access is to be initiated.

Here the identification information of the UE may be a CCCH SDU, or another form of identification information of the UE. What is carried in the CCCH SDU may vary with what the random access is intended for. For example, if the access is intended for an initial access, then the CCCH SDU will carry an RRC Connection Establish Request message; and if the access is intended to reestablish an RRC connection, then the CCCH SDU will carry an RRC Connection Reestablish Request message.

Optionally if the dedicated contention resource pool for a random access allocated by the cell is greater than a first threshold, then the UE may further carry BSR information, and/or a part or all of data to be transmitted, while transmitting the identification information of the UE.

In the operation 3, the cell 1 makes a contention decision, that is, if the cell 1 receives the identification information of the UE transmitted by the UE in the operation 2, then it will determine that the UE succeeds in contention.

For the initial access and the RRC connection reestablish, if the cell 1 determines that the UE succeeds in contention, then it will allocate a C-RNTI for the UE.

If the radius of the cell 1 is greater than a second threshold, for example, the second threshold is the size of a TA adjustment step (78 m), then the cell may further determine the TA of the UE upon determining that the UE succeeds in contention.

In the operation 4, the cell 1 transmits a contention resolution message to the UE.

The contention resolution message may include the identification information of the UE transmitted by the UE over a dedicated contention resource for a random access in the operation 2.

The contention resolution message may be transmitted in the following two options.

Opt1: The resource over which the contention resolution message is transmitted is a transmission resource corresponding to a second resource message broadcasted by the cell.

Opt2: A CB-RNTI is introduced, and used by the cell to schedule the resource over which the contention resolution message is transmitted.

The UE listens to the contention resolution message in a time window configured by an eNB at the resource position of the dedicated contention resource pool for a random access broadcasted by the cell, or the resource position, at which the contention resolution message is transmitted, scheduled by the CB-RNTI, and if the contention resolution message including the identification information of the UE is received, then it will determine that it succeeds in contention. If the time window expires, then it will determine that it fails with contention, and attempt at a random access again as in the operations 2 to 4.

In a second embodiment, a UE makes a random access for UL synchronization (a contention based random access).

The UE makes an initial access to a cell for the purpose of UL synchronization, and this scenario is applicable to the case in which the UE has uplink data to be transmitted, but there is out of synchronization in the UL.

Figure 9:
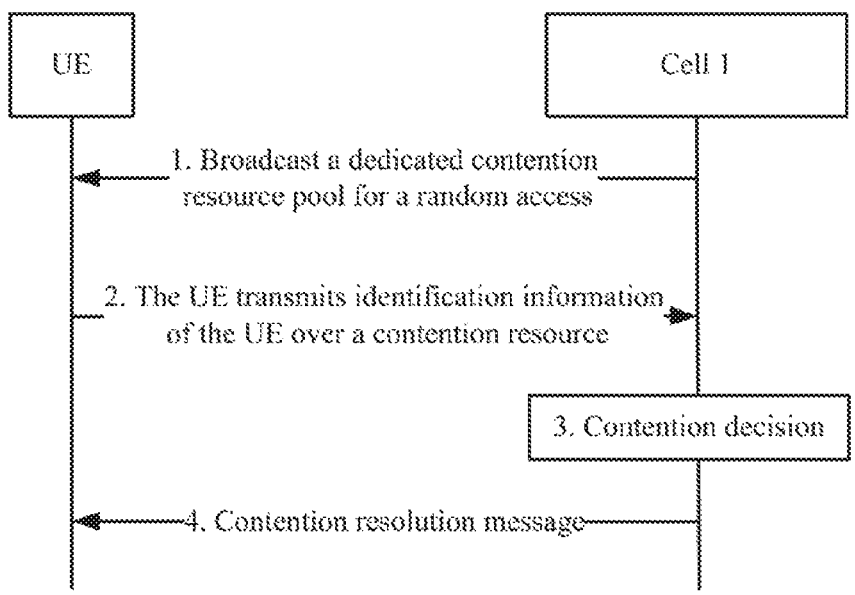
FIG. 9 is a schematic flow chart of a method for a random access in UL synchronization according to an embodiment of the invention.

As illustrated in FIG. 9, a method for making an initial access for UL synchronization according to an embodiment of the invention includes the following operations.

In the operation 1, a cell 1 broadcasts resource information for determining a dedicated contention resource pool for a random access, via system information.

Optionally the resource information may include a time-frequency position corresponding to the dedicated contention resource pool for a random access, an allowable MCS level, and a priority.

In the operation 2, a UE to access the cell 1 reads the broadcasted message, and obtains the resource information (e.g., the time-frequency position, the MCS, etc.). If there are a plurality of resource pools configured, then the UE may further select one of the dedicated contention resource pools for a random access according to their corresponding priorities. Then the UE transmits identification information of the UE using the selected dedicated contention resource pool for a random access based upon downlink timing of the cell to which a random access is to be initiated.

Here the identification information of the UE may be a C-RNTI MAC CE, or another form of identification information of the UE.

Optionally if the dedicated contention resource pool for a random access allocated by the cell is greater than first threshold, then the UE may further carry BSR information, and/or a part or all of data to be transmitted, while transmitting the identification information of the UE.

In the operation 3, the cell 1 makes a contention decision, that is, if the cell 1 receives the identification information of the UE transmitted by the UE in the operation 2, then it will determine that the UE succeeds in contention.

In the operation 4, the cell 1 transmits a contention resolution message to the UE.

In the case of out of synchronization in the UL, the contention resolution message may be PDCCH scheduling information, including an initial UL grant, for the UE C-RNTI.

In the case of out of synchronization in the UL, the contention resolution message is scheduled by a PDCCH addressed using the C-RNTI, so the transmission resource may be any PDSCH resource.

Optionally the cell 1 may carry an uplink TA of the UE available in the cell in the contention resolution message and transmit it to the UE; or the UE 1 may subsequently transmit the uplink TA to the UE using the C-RNTI.

Figure 10:
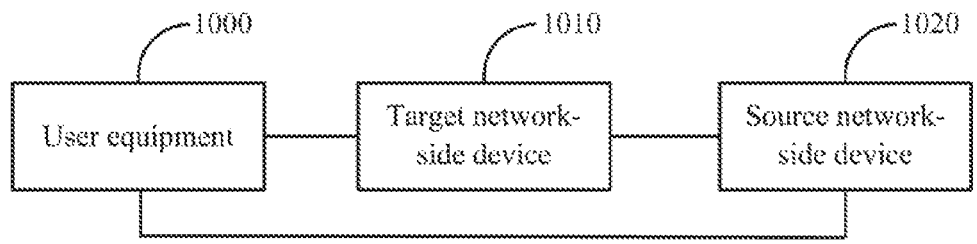
FIG. 10 is a schematic structural diagram of a second system for a random access according to an embodiment of the invention.

As illustrated in FIG. 10, a second system for a random access according to an embodiment of the invention includes a user equipment 1000, a target network-side device 1010, and a source network-side device 1020.

The user equipment 1000 is configured to obtain second resource information through the source network-side device managing a source cell when it needs to be switched; determine an uplink transmission dedicated resource allocated for the user equipment by the target network-side device managing a target cell, according to the second resource information; and access the target cell over the uplink transmission dedicated resource.

The target network-side device 1010 is configured to allocate the uplink transmission dedicated resource for the user equipment to be switched; and notify the source cell of the allocated uplink transmission dedicated resource.

The source network-side device 1020 is configured to transmit a Handover Request message to the target cell when the user equipment needs to be switched, and notify the user equipment of the uplink transmission dedicated resource allocated by the target cell for the user equipment.

Optionally if the target network-side device receives the Handover Request message from the source cell, then it will allocate the uplink transmission dedicated resource for the user equipment to be switched.

In an implementation, the target network-side device notifies the source cell of the second resource information corresponding to the allocated uplink transmission dedicated resource via an X2 interface.

Optionally the target network-side device may put the second resource information corresponding to the allocated uplink transmission dedicated resource in a Handover Request Acknowledge message, and transmit it to the source cell.

It shall be noted that another message, than the Handover Request Acknowledge message, in which the source cell may be notified of the allocated uplink transmission dedicated resource will be applicable to the embodiment of the invention.

Correspondingly the source network-side device notifies the user equipment of the second resource information corresponding to the uplink transmission dedicated resource allocated by the target cell for the user equipment.

Optionally the source cell notifies the user equipment of the uplink transmission dedicated resource allocated by the target cell for the user equipment via an RRC Reconfigure message including mobility control information.

Correspondingly the user equipment obtains the second resource information via the RRC Reconfigure message transmitted by the source cell.

It shall be noted that another message, than the RRC Acknowledge message, in which the user equipment may be notified of the allocated uplink transmission dedicated resource will be applicable to the embodiment of the invention.

The user equipment determines the uplink transmission dedicated resource according to the second resource information after obtaining the second resource information, and transmits an RRC Reconfigure Complete message to the target cell over the uplink transmission dedicated resource.

Optionally if the radius of the target cell is greater than a second threshold, then the target network-side device may further configure an uplink TA available in the cell for the user equipment upon determining that the user equipment succeeds in contention.

The second threshold here may be determined empirically, as a result of simulation, as demanded, etc. For example, the second threshold may be set to the size of a TA adjustment step. At present, the size of a TA adjustment step is 78 m.

Optionally the target cell notifies the user equipment of the uplink TA of the user equipment in the target cell over a PDCCH addressed based upon a C-RNTI of the UE upon reception of the RRC Reconfigure Complete message transmitted by the user equipment.

It shall be noted that another message, than the RRC Acknowledge message, in which the user equipment may be notified of the allocated uplink transmission dedicated resource will be applicable to the embodiment of the invention.

In an implementation, both the target cell and the source cell may be managed by the same network-side device, so both the target network-side device and the source network-side device according to the embodiments of the invention may also be the same network-side device.

Figure 11:
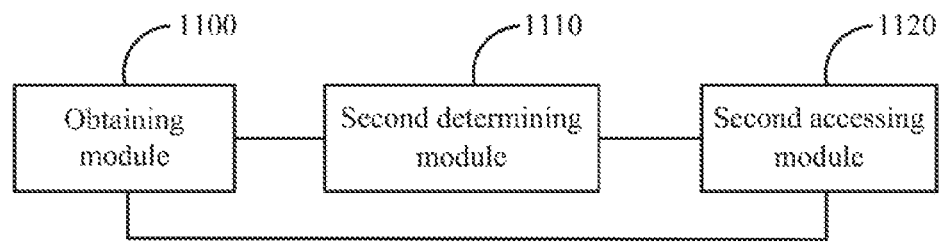
FIG. 11 is a schematic structural diagram of a third user equipment according to an embodiment of the invention.

As illustrated in FIG. 11, a third user equipment according to an embodiment of the invention includes: an obtaining module 1100 configured to obtain second resource information over a source cell when the user equipment needs to be switched; a second determining module 1110 configured to determine an uplink transmission dedicated resource allocated by a target cell for the user equipment, according to the second resource information; and a second accessing module 1120 configured to access the target cell over the uplink transmission dedicated resource.

Optionally the obtaining module 1100 is configured to obtain the second resource information in an RRC Reconfigure message transmitted by the source cell.

Correspondingly the second accessing module 1120 is configured to: transmit an RRC Reconfigure Complete message to the target cell over the uplink transmission dedicated resource.

Since the user equipment may make a contention based random access or a non-contention based random access in different scenarios, the user equipment in FIG. 2, and the user equipment in FIG. 11 may be integrated into the same user equipment.

Figure 12:
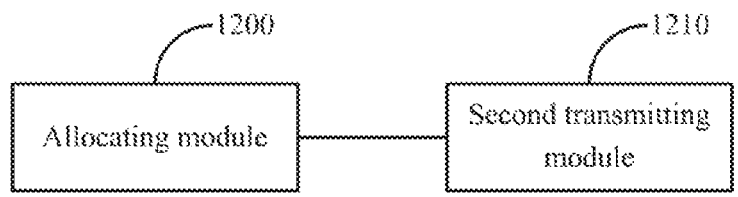
FIG. 12 is a schematic structural diagram of a third network-side device according to an embodiment of the invention.

As illustrated in FIG. 12, a third network-side device according to an embodiment of the invention includes: an allocating module 1200 configured to allocate an uplink transmission dedicated resource for a user equipment to be switched; and a second transmitting module 1210 configured to notify a source cell of the allocated uplink transmission dedicated resource so that the source cell notifies the user equipment of the uplink transmission dedicated resource, and the user equipment accesses a target cell over the uplink transmission dedicated resource.

Optionally the allocating module 1200 is configured to allocate the uplink transmission dedicated resource for the user equipment to be switched, upon reception of a Handover Request message from the source cell.

Optionally the second transmitting module 1210 is configured to notify the source cell of second resource information corresponding to the allocated uplink transmission dedicated resource via an X2 interface.

Optionally the second transmitting module 1210 is configured: T to notify the source cell of allocated uplink transmission dedicated resource via a Handover Request Acknowledge message.

Optionally the second transmitting module 1210 is further configured: after notifying the source cell of the allocated uplink transmission dedicated resource, notify the user equipment of an uplink TA of the user equipment in the target cell over a PDCCH addressed based upon a C-RNTI of the UE upon reception of an RRC Reconfigure Complete message transmitted by the user equipment.

Figure 13:
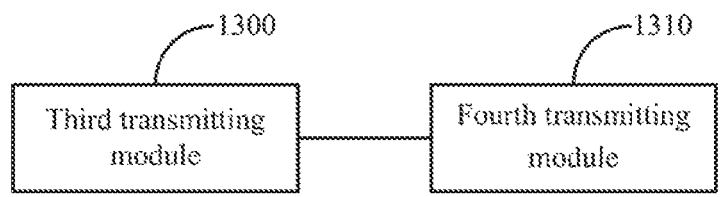
FIG. 13 is a schematic structural diagram of a fourth network-side device according to an embodiment of the invention.

As illustrated in FIG. 13, a fourth network-side device according to an embodiment of the invention includes: a third transmitting module 1300 configured to transmit a Handover Request message to a target cell when a user equipment needs to be switched; and a fourth transmitting module 1310 configured to notify the user equipment of an uplink transmission dedicated resource allocated by the target cell for the user equipment so that the user equipment accesses the target cell over the uplink transmission dedicated resource.

Optionally the fourth transmitting module 1310 is configured to notify the user equipment of the uplink transmission dedicated resource allocated by the target cell for the user equipment via an RRC Reconfigure message including mobility control information.

In an implementation, both the source cell and the target cell may be managed by the same network-side device, so both the network-side device in FIG. 12, and the network-side device in FIG. 13 according to the embodiments of the invention may be the same network-side device.

In an implementation, the network-side device may make a random access in a contention based mode, or may make a random access in a non-contention based mode, in different scenarios, so the network-side device in FIG. 3, and the network-side device in FIG. 12 according to the embodiments of the invention may be integrated into the same network-side device; the network-side device in FIG. 3, and the network-side device in FIG. 13 may be integrated into the same network-side device; and the network-side device in FIG. 3, the network-side device in FIG. 12, and the network-side device in FIG. 13 may be integrated into the same network-side device.

Figure 14:
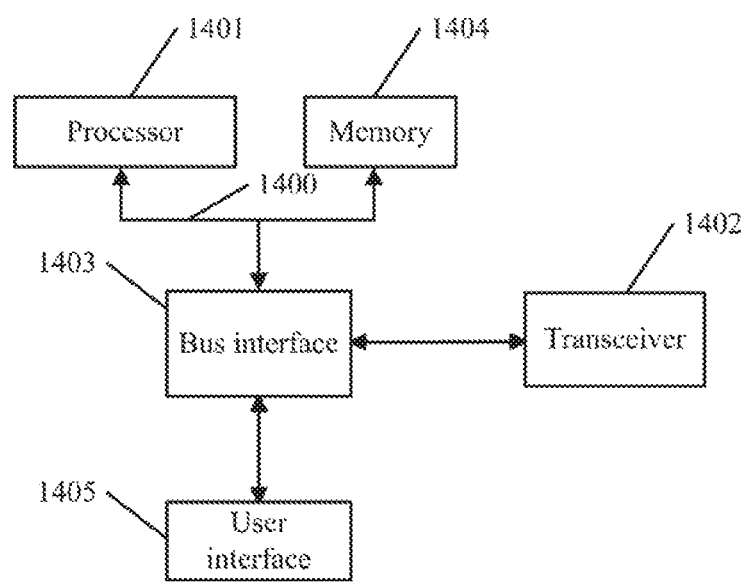
FIG. 14 is a schematic structural diagram of a fourth user equipment according to an embodiment of the invention.

As illustrated in FIG. 14, a fourth user equipment according to an embodiment of the invention includes: a processor 1401 configured to read programs in a memory 1404 to: obtain through a transceiver 1402 second resource information over a source cell when the user equipment needs to be switched; determine an uplink transmission dedicated resource allocated by a target cell for the user equipment, according to the second resource information; and access the target cell over the uplink transmission dedicated resource through the transceiver 1402; and the transceiver 1402 configured to be controlled by the processor 1401 to receive and transmit data.

Optionally the processor 1401 is configured to obtain the second resource information in an RRC Reconfigure message transmitted by the source cell.

Correspondingly the processor 1401 is configured to transmit an RRC Reconfigure Complete message to the target cell over the uplink transmission dedicated resource.

In FIG. 14, the bus architecture is represented as a bus 1400, and the bus 1400 may include any number of interconnecting buses and bridges to particularly link together various circuits including one or more processors represented by the processor 1401, and one or more memories represented by the memory 1404. The bus 1400 may further link together various other circuits, e.g., peripheral devices, manostats, power management circuits, etc., all of which are well known in the art, so a further description thereof will be omitted in this context. The bus interface 1403 serves as an interface between the bus 1400 and the transceiver 1402. The transceiver 1402 may be a number of elements including a transmitter and a receiver which are units for communication with various other devices over a transmission medium. For example, the transceiver 1402 receives external data from another device. The transceiver 1402 is configured transmit data processed by the processor 1401 to the other device. Dependent upon the nature of a computing system, there may be further provided a user interface 1405, e.g., a keypad, a display, a speaker, a microphone, a joystick, etc.

The processor 1401 is responsible for managing the bus 1400 and performing normal processes, e.g., running a general operating system, and the memory 1404 may be configured to store data used by the processor 1401 to perform the operations.

Optionally the processor 1401 may be a CPU, an ASIC, an FPGA, or a CPLD.

Since the user equipment may make a contention based random access or a non-contention based random access in different scenarios, the user equipment in FIG. 4, and the user equipment in FIG. 14 may be integrated into the same user equipment.

Figure 15:
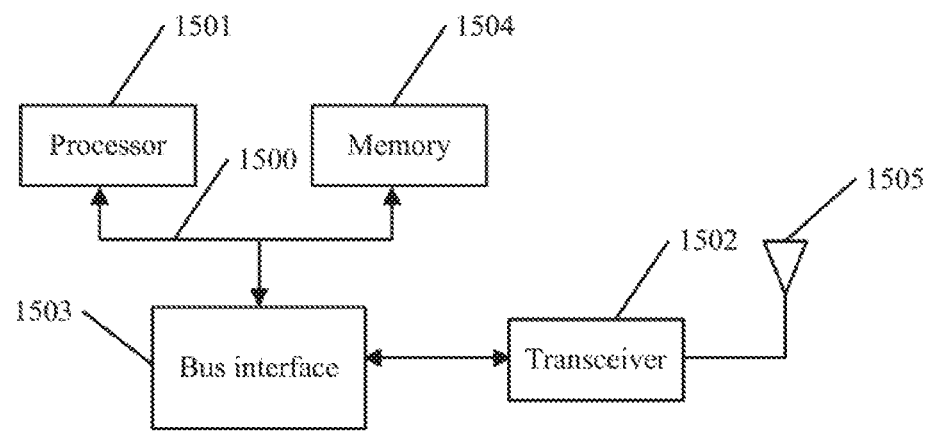
FIG. 15 is a schematic structural diagram of a fifth network-side device according to an embodiment of the invention.

As illustrated in FIG. 15, a fifth network-side device according to an embodiment of the invention includes: a processor 1501 configured to read programs in a memory 1504 to: allocate an uplink transmission dedicated resource for a user equipment to be switched; and notify through a transceiver 1502 a source cell of the allocated uplink transmission dedicated resource so that the source cell notifies the user equipment of the uplink transmission dedicated resource, and the user equipment accesses a target cell over the uplink transmission dedicated resource; and he transceiver 1502 configured to be controlled by the processor 1501 to receive and transmit data.

Optionally the processor 1501 is configured to: allocate the uplink transmission dedicated resource for the user equipment to be switched, upon reception of a Handover Request message from the source cell.

Optionally the processor 1501 is configured to: notify the source cell of second resource information corresponding to the allocated uplink transmission dedicated resource via an X2 interface.

Optionally the processor 1501 is configured to: notify the source cell of second resource information corresponding to the allocated uplink transmission dedicated resource via a Handover Request Acknowledge message.

Optionally the processor 1501 is further configured: after notifying the source cell of the allocated uplink transmission dedicated resource, to notify the user equipment of an uplink TA of the user equipment in the target cell over a PDCCH addressed based upon a C-RNTI of the UE upon reception of an RRC Reconfigure Complete message transmitted by the user equipment.

In FIG. 15, the bus architecture is represented as a bus 1500, and the bus 1500 may include any number of interconnecting buses and bridges to particularly link together various circuits including one or more processors represented by the processor 1501, and one or more memories represented by the memory 1504. The bus 1500 may further link together various other circuits, e.g., peripheral devices, manostats, power management circuits, etc., all of which are well known in the art, so a further description thereof will be omitted in this context. The bus interface 1503 serves as an interface between the bus 1500 and the transceiver 1502. The transceiver 1502 may be a number of elements including a transmitter and a receiver which are units for communication with various other devices over a transmission medium. Data processed by the processor 1501 are transmitted over the transmission medium through an antenna 1505, and furthermore the antenna 1505 further receives and transmits data to the processor 1501.

The processor 1501 is responsible for managing the bus 1500 and performing normal processes, and may further provide various functions including timing, a peripheral interface, voltage regulation, power supply management, and other control functions, and the memory 1504 may be configured to store data for use by the processor 1501 in performing the operations.

Optionally the processor 1501 may be a CPU, an ASIC, an FPGA, or a CPLD.

Figure 16:
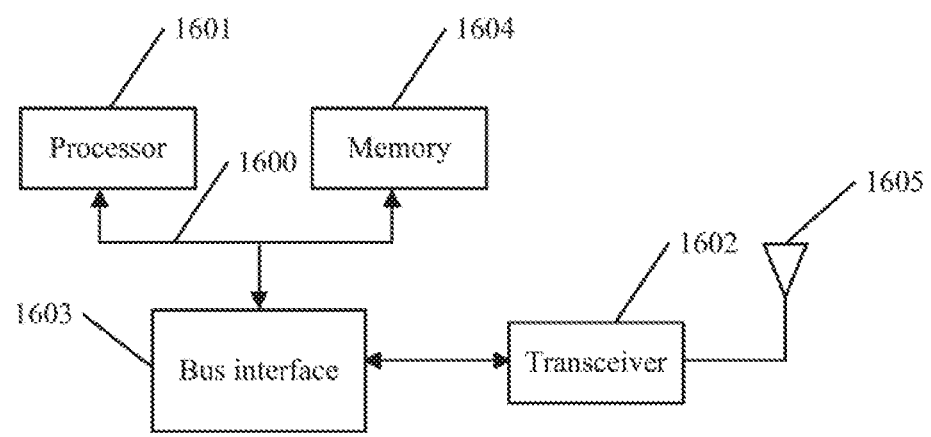
FIG. 16 is a schematic structural diagram of a sixth network-side device according to an embodiment of the invention.

As illustrated in FIG. 16, a sixth network-side device according to an embodiment of the invention includes: a processor 1601 configured to read programs in a memory 1604 to: transmit through a transceiver 1602 a Handover Request message to a target cell when a user equipment needs to be switched; and notify through the transceiver 1602 the user equipment of an uplink transmission dedicated resource allocated by the target cell for the user equipment so that the user equipment accesses the target cell over the uplink transmission dedicated resource; and the transceiver 1602 configured to be controlled by the processor 1601 to receive and transmit data.

Optionally the processor 1601 is configured to notify the user equipment of the uplink transmission dedicated resource allocated by the target cell for the user equipment via an RRC Reconfigure message including mobility control information.

In FIG. 16, the bus architecture is represented as a bus 1600, and the bus 1600 may include any number of interconnecting buses and bridges to particularly link together various circuits including one or more processors represented by the processor 1601, and one or more memories represented by the memory 1604. The bus 1600 may further link together various other circuits, e.g., peripheral devices, manostats, power management circuits, etc., all of which are well known in the art, so a further description thereof will be omitted in this context. The bus interface 1603 serves as an interface between the bus 1600 and the transceiver 1602. The transceiver 1602 may be a number of elements including a transmitter and a receiver which are units for communication with various other devices over a transmission medium. Data processed by the processor 1601 are transmitted over the transmission medium through an antenna 1605, and furthermore the antenna 1605 further receives and transmits data to the processor 1601.

The processor 1601 is responsible for managing the bus 1600 and performing normal processes, and may further provide various functions including timing, a peripheral interface, voltage regulation, power supply management, and other control functions, and the memory 1604 may be configured to store data used by the processor 1601 to perform the operations.

Optionally the processor 1601 may be a CPU, an ASIC, an FPGA, or a CPLD.

In an implementation, both the source cell and the target cell may be managed by the same network-side device, so both the network-side device in FIG. 15, and the network-side device in FIG. 16 according to the embodiments of the invention may be the same network-side device.

In an implementation, the network-side device may make a random access in a contention based mode, or may make a random access in a non-contention based mode, in different scenarios, so the network-side device in FIG. 5, and the network-side device in FIG. 15 according to the embodiments of the invention may be integrated into the same network-side device; the network-side device in FIG. 5, and the network-side device in FIG. 16 may be integrated into the same network-side device; and the network-side device in FIG. 5, the network-side device in FIG. 15, and the network-side device in FIG. 16 may be integrated into the same network-side device.

Based upon the same inventive idea, embodiments of the invention further provide methods for a random access, and since devices corresponding to the methods are the devices in the system for a random access according to the embodiments of the invention, and the methods address the problem under a similar principle to that of the system, reference may be made to the implementations of the devices for implementations of the methods, so a repeated description thereof will be omitted here.

Figure 17:
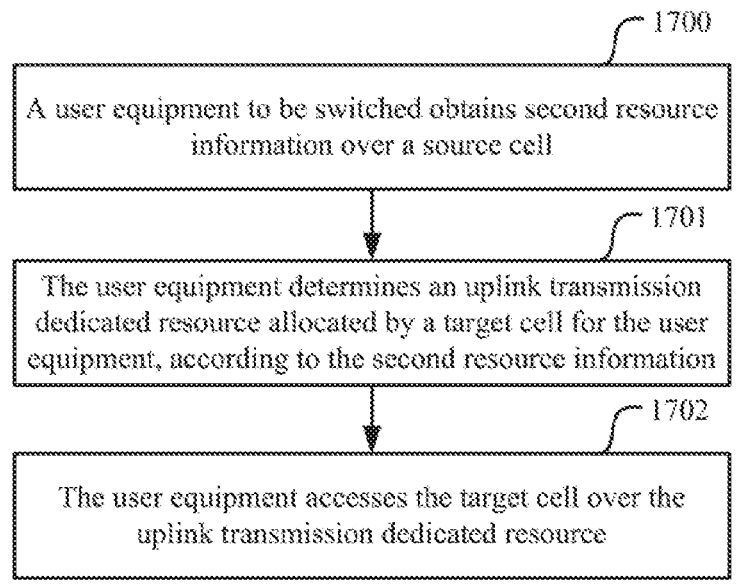
FIG. 17 is a schematic flow chart of a third method for a random access according to an embodiment of the invention.

As illustrated in FIG. 17, a third method for a random access according to an embodiment of the invention includes the following operations.

Operation 1700: a user equipment to be switched obtains second resource information over a source cell.

Operation 1701: the user equipment determines an uplink transmission dedicated resource allocated by a target cell for the user equipment, according to the second resource information.

Operation 1702: the user equipment accesses the target cell over the uplink transmission dedicated resource.

Optionally the user equipment obtains the second resource information over the source cell includes: the user equipment obtains the second resource information in an RRC Reconfigure message transmitted by the source cell.

The user equipment accesses the target cell over the uplink transmission dedicated resource includes: the user equipment transmits an RRC Reconfigure Complete message to the target cell over the uplink transmission dedicated resource.

In the following description, the target cell which is an executor of a method is equivalent to a network-side device managing the target cell.

Figure 18:
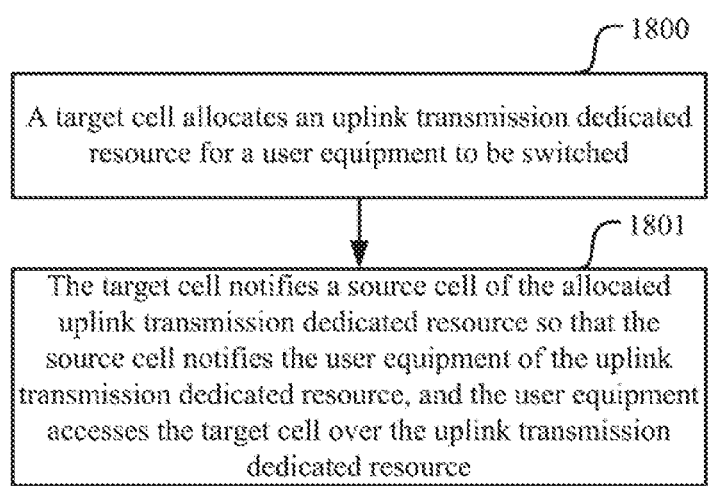
FIG. 18 is a schematic flow chart of a fourth method for a random access according to an embodiment of the invention.

As illustrated in FIG. 18, a fourth method for a random access according to an embodiment of the invention includes the following operations.

Operation 1800: a target cell determines an uplink transmission dedicated resource for a user equipment to be switched.

Operation 1801, the target cell notifies a source cell of the allocated uplink transmission dedicated resource so that the source cell notifies the user equipment of the uplink transmission dedicated resource, and the user equipment accesses the target cell over the uplink transmission dedicated resource.

Optionally before the target cell allocates the uplink transmission dedicated resource for the user equipment to be switched, the method further includes: the target cell receives a Handover Request message from the source cell.

Optionally the target cell notifies the source cell of the allocated uplink transmission dedicated resource includes: the target cell notifies the source cell of second resource information corresponding to the allocated uplink transmission dedicated resource via an X2 interface.

Optionally the target cell notifies the source cell of the allocated uplink transmission dedicated resource includes: the target cell notifies the source cell of the allocated uplink transmission dedicated resource via a Handover Request Acknowledge message.

Optionally after the target cell notifies the source cell of the allocated uplink transmission dedicated resource, the method further includes: the target cell notifies the user equipment of an uplink TA in the target cell over a PDCCH addressed based upon a C-RNTI of the UE upon reception of an RRC Reconfigure Complete message transmitted by the user equipment.

In the following description, the source cell which is an executor of a method is equivalent to a network-side device managing the source cell.

Figure 19:
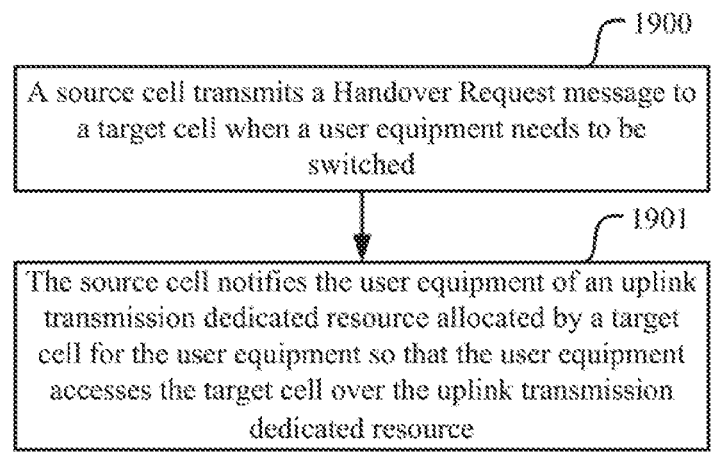
FIG. 19 is a schematic flow chart of a fifth method for a random access according to an embodiment of the invention.

As illustrated in FIG. 19, a fifth method for making a random access according to an embodiment of the invention includes the following operations.

Operation 1900: a source cell transmits a Handover Request message to a target cell when a user equipment needs to be switched.

Operation 1901: the source cell notifies the user equipment of an uplink transmission dedicated resource allocated by a target cell for the user equipment so that the user equipment accesses the target cell over the uplink transmission dedicated resource.

Optionally the source cell notifies the user equipment of the uplink transmission dedicated resource allocated by the target cell for the user equipment includes: the source notifies the user equipment of the uplink transmission dedicated resource allocated by the target cell for the user equipment via an RRC Reconfigure message including mobility control information.

An example in which a delay of a non-contention based random access is optimized (in the case of switching) will be described below.

Figure 20:
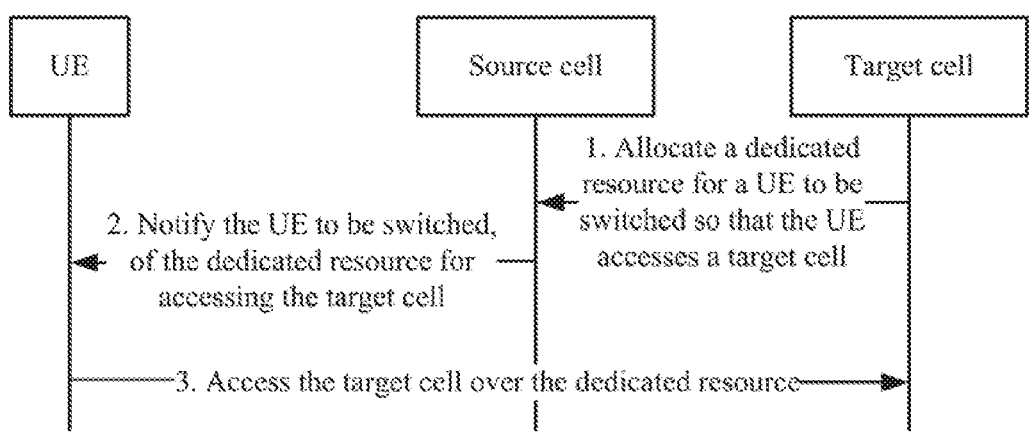
FIG. 20 is a schematic flow chart of a method for a non-contention based random access according to an embodiment of the invention.

As illustrated in FIG. 20, a method for a non-contention based random access according to an embodiment of the invention includes the following operations.

In a first operation 1, a target cell allocates an uplink transmission dedicated resource for a UE to be switched upon reception of a Handover Request message transmitted by a source cell, so that the UE accesses a target cell in initial uplink transmission.

The target cell encapsulates information about the uplink transmission dedicated resource determined for the UE in a Target eNB to Source eNB Transparent Container in a Handover Request Acknowledge message transmitted to the source cell.

In the operation 2, the source cell transmits to the UE an RRC Reconfigure message, including mobility control information, which includes the information about the uplink transmission dedicated resource allocated by the target cell for the UE to access the target cell.

In the operation 3, the UE determines the uplink transmission dedicated resource corresponding to the information in the received RRC Reconfigure message received from the source cell, and transmits an RRC Reconfigure Complete message to the target cell over the uplink transmission dedicated resource based upon downlink timing of the target cell to thereby access the target cell.

Optionally if the radius of the target cell is greater than a second threshold, e.g., the size of a TA adjustment step (78 m), then the target cell will transmit an uplink TA of the UE in the target cell over a PDCCH addressed based upon a C-RNTI of the UE upon reception of the RRC Reconfigure Complete message transmitted by the UE.

As can be apparent from the disclosure above, in the contention based random access procedure according to the embodiments of the invention, the user equipment transmits the identification information of the user equipment to the cell over the resource in the dedicated contention resource pool for a random access; and if the user equipment receives the contention resolution message from the cell, then it will determine whether the random access succeeds, according to the contention resolution message. In the non-contention based random access procedure according to the embodiments of the invention, the user equipment determines the uplink transmission dedicated resource allocated by the target cell for the user equipment, according to the second resource information; and accesses the target cell over the uplink transmission dedicated resource. The number of interaction stages in the random access procedure may be reduced to thereby shorten a delay of the random access, so that it can be applied to a scenario having a strict requirement of delay.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for a random access, the method comprising determining, by a user equipment, a dedicated contention resource pool for a random access when the user equipment accesses a cell;
transmitting, by the user equipment, identification information of the user equipment to the cell over a resource in the dedicated contention resource pool for a random access; and
receiving, by the user equipment, a contention resolution message from the cell, and determining whether the random access succeeds, according to the contention resolution message.

2. The method according to claim 1, wherein the determining, by the user equipment, the dedicated contention resource pool for a random access when the user equipment accesses a cell comprises:
determining, by the user equipment, the dedicated contention resource pool for a random access according to first resource information broadcasted by the cell.

3. The method according to claim 2, wherein the determining, by the user equipment, the dedicated contention resource pool for a random access according to the first resource information broadcasted by the cell comprises:
determining, by the user equipment, a plurality of dedicated contention resource pools for a random access according to the first resource information broadcasted by the cell, and selecting one of the dedicated contention resource pools for a random access.

4. The method according to claim 1, wherein the transmitting, by the user equipment, the identification information of the user equipment to the cell over the resource in the dedicated contention resource pool for a random access comprises:
transmitting, by the user equipment, the identification information of the user equipment to the cell over the resource in the dedicated contention resource pool for a random access based upon downlink timing of the cell.

5. The method according to claim 1, wherein if the random access is intended for an initial access of the user equipment, or to reestablish a Radio Resource Control, RRC, connection by the user equipment, then the identification information of the user equipment will be a Common Control Channel, CCCH, Service Data Unit, SDU; or if the random access is intended for uplink synchronization, then the identification information of the user equipment will be a Cell Radio Network Temporary Identifier, C-RNTI, Media Access Control, MAC, Control Element, CE.

6. The method according to claim 5, wherein the determining, by the user equipment, whether the random access succeeds, according to the contention resolution message comprises:
if a CCCH SDU in the contention resolution message is a CCCH SDU transmitted to the cell, then determining that the random access succeeds; otherwise, determining that the random access fails; or
if the contention resolution message comprises a PDCCH addressed using a C-RNTI MAC CE transmitted to the cell, then determining that the random access succeeds; otherwise, determining that the random access fails.

7. The method according to claim 1, wherein after determining, by the user equipment, the dedicated contention resource pool for a random access when the user equipment accesses the cell, the method further comprises:
if a capacity of the determined dedicated contention resource pool for a random access is greater than a first threshold, then transmitting, by the user equipment, Buffer Status Report, BSR, information, and/or a part or all of data to be transmitted, to the cell.

8. The method according to claim 1, wherein the receiving, by the user equipment, the contention resolution message comprises:
if the random access of the user equipment is intended for an initial access or to reestablish an RRC connection, then receiving, by the user equipment, the contention resolution message over a resource pool corresponding to second resource information broadcasted by the cell, or receiving the contention resolution message over a resource scheduled using a CB-RNTI; or
if the random access of the user equipment is for uplink synchronization, then receiving, by the user equipment, the contention resolution message over a Physical Downlink Shared Channel, PDSCH, resource scheduled by a Physical Downlink Control Channel, PDCCH, addressed using a C-RNTI.

9. The method according to claim 1, wherein the method further comprises:
if the user equipment does not receive the contention resolution message in a contention resolution time window, then reselecting a dedicated contention resource pool for a random access, and initiating a random access again, after waiting for a period of time randomly.

10. A method for a random access, the method comprising:
broadcasting, by a cell, first resource information for determining a dedicated contention resource pool for a random access;
receiving, by the cell, identification information of a user equipment, transmitted by the user equipment to access the cell, over the dedicated contention resource pool for a random access corresponding to the information about the dedicated contention resource pool for a random access; and
transmitting, by the cell, a contention resolution message to the user equipment upon reception of the identification information of the user equipment.

11. The method according to claim 10, wherein after the cell receives the identification information of the user equipment, the method further comprises:

if the user equipment makes an initial access or establishes an RRC connection, then allocating, by the cell, a C-RNTI for the user equipment.

12. The method according to claim 10, wherein after the cell receives the identification information of the user equipment, the method further comprises:
    if a radius of the cell greater than a second threshold, then configuring, by the cell, uplink TA available in the cell for the user equipment.

13. The method according to claim 10, wherein if the user equipment makes an initial access or establishes an RRC connection, then the contention resolution message will comprise the identification information of the user equipment; or
    if the random access of the user equipment is intended for uplink synchronization, then the contention resolution message will be PDCCH scheduling information, comprising an initial transmission uplink grant, for a C-RNTI of the user equipment.

14. The method according to claim 10, wherein transmitting, by the cell, the contention resolution message to the user equipment comprises:
    if the random access of the user equipment is intended for an initial access or to reestablish an RRC connection, then transmitting, by the cell, the contention resolution message to the user equipment over a resource pool corresponding to second resource information broadcasted by the cell, or transmitting the contention resolution message to the user equipment over a resource scheduled using a CB-RNTI; or
    if the random access of the user equipment is intended for uplink synchronization, then transmitting, by the cell, the contention resolution message to the user equipment over a PDSCH resource scheduled by a PDCCH addressed using a C-RNTI.

15. The method according to claim 11, wherein transmitting, by the cell, the contention resolution message to the user equipment comprises:
    if the random access of the user equipment is intended for an initial access or to reestablish an RRC connection, then transmitting, by the cell, the contention resolution message to the user equipment over a resource pool corresponding to second resource information broadcasted by the cell, or transmitting the contention resolution message to the user equipment over a resource scheduled using a CB-RNTI; or
    if the random access of the user equipment is intended for uplink synchronization, then transmitting, by the cell, the contention resolution message to the user equipment over a PDSCH resource scheduled by a PDCCH addressed using a C-RNTI.

16. The method according to claim 12, wherein transmitting, by the cell, the contention resolution message to the user equipment comprises:
    if the random access of the user equipment is intended for an initial access or to reestablish an RRC connection, then transmitting, by the cell, the contention resolution message to the user equipment over a resource pool corresponding to second resource information broadcasted by the cell, or transmitting the contention resolution message to the user equipment over a resource scheduled using a CB-RNTI; or
    if the random access of the user equipment is intended for uplink synchronization, then transmitting, by the cell, the contention resolution message to the user equipment over a PDSCH resource scheduled by a PDCCH addressed using a C-RNTI.

17. The method according to claim 13, wherein transmitting, by the cell, the contention resolution message to the user equipment comprises:
    if the random access of the user equipment is intended for an initial access or to reestablish an RRC connection, then transmitting, by the cell, the contention resolution message to the user equipment over a resource pool corresponding to second resource information broadcasted by the cell, or transmitting the contention resolution message to the user equipment over a resource scheduled using a CB-RNTI; or
    if the random access of the user equipment is intended for uplink synchronization, then transmitting, by the cell, the contention resolution message to the user equipment over a PDSCH resource scheduled by a PDCCH addressed using a C-RNTI.

* * * * *